United States Patent
Oropesa

(10) Patent No.: US 10,282,150 B2
(45) Date of Patent: May 7, 2019

(54) INFORMATION PROCESSING DEVICE AND IMAGE FORMING SYSTEM

(71) Applicant: KYOCERA Document Solutions Inc., Osaka (JP)

(72) Inventor: Jamielyn Monique Oropesa, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/912,880

(22) Filed: Mar. 6, 2018

(65) Prior Publication Data
US 2018/0275932 A1   Sep. 27, 2018

(30) Foreign Application Priority Data

Mar. 21, 2017   (JP) .................................. 2017-054243

(51) Int. Cl.
  *G06F 3/12*   (2006.01)
  *H04N 1/00*   (2006.01)
  *G06K 15/02*   (2006.01)

(52) U.S. Cl.
  CPC ............. *G06F 3/1254* (2013.01); *G06F 3/126* (2013.01); *G06F 3/1208* (2013.01); *G06F 3/1256* (2013.01); *G06F 3/1285* (2013.01); *G06F 3/1297* (2013.01); *H04N 1/0044* (2013.01); *H04N 1/00411* (2013.01); *H04N 1/00472* (2013.01)

(58) Field of Classification Search
None
See application file for complete search history.

(56) References Cited

U.S. PATENT DOCUMENTS

| | | | | |
|---|---|---|---|---|
| 5,839,837 A | * | 11/1998 | Takehara | B41J 3/4075 400/76 |
| 5,890,820 A | * | 4/1999 | Handa | B41J 2/17546 347/172 |
| 2002/0051182 A1 | * | 5/2002 | Sommer | H04N 1/00408 358/1.15 |

(Continued)

FOREIGN PATENT DOCUMENTS

| | | | | |
|---|---|---|---|---|
| JP | H10-173949 A | | 6/1998 | |
| JP | 2001-293907 A | | 10/2001 | |
| JP | 2004-023771 | * | 1/2004 | ............. H04N 1/407 |

*Primary Examiner* — Beniyam Menberu
(74) *Attorney, Agent, or Firm* — IP Business Solutions, LLC

(57) ABSTRACT

An information processing device includes a display unit, an operation reception unit, a communication unit, a storage unit, a printer driver unit, and a communication control section. When the operation reception unit receives designation of a color of a recording medium, the printer driver unit acquires position information of a paper feed cassette associated with color information indicating the designated color of the recording paper from the storage unit, and adds, as a part of printing conditions, a first command for instructing that the acquired recording medium be used in a printing process. When the operation reception unit receives designation of a color of a character and an effect and color used for the effect, the printer driver unit adds, as a part of printing conditions, a second command for instructing that the designated character color and effect and color used for the effect be used in the printing process.

8 Claims, 26 Drawing Sheets

(56) References Cited

U.S. PATENT DOCUMENTS

| | | | | |
|---|---|---|---|---|
| 2003/0020229 A1* | 1/2003 | Nishimura | ............... | B65H 3/44 |
| | | | | 271/9.05 |
| 2007/0240042 A1* | 10/2007 | Sato | ..................... | G06F 3/1208 |
| | | | | 715/209 |
| 2008/0062199 A1* | 3/2008 | Maheshwari | ......... | G06F 3/1205 |
| | | | | 345/630 |
| 2008/0080000 A1* | 4/2008 | Kadota | ................ | G06K 15/129 |
| | | | | 358/1.15 |
| 2009/0135441 A1* | 5/2009 | Sakuraba | .............. | G06F 3/1204 |
| | | | | 358/1.13 |
| 2012/0105879 A1* | 5/2012 | Tanaka | ................. | H04N 1/6033 |
| | | | | 358/1.9 |
| 2014/0355069 A1* | 12/2014 | Caton | ................... | H04N 1/0087 |
| | | | | 358/3.28 |
| 2016/0110140 A1* | 4/2016 | Nagai | ................... | G06F 3/1229 |
| | | | | 358/2.1 |

* cited by examiner

Fig.9

INFORMATION!

PLEASE DESIGNATE PRINTING CHARACTER CHANGE RANGE.

CHANGE ALL CHARACTERS

DESIGNATE CHANGE CHARACTER

Fig.13

| COLOR OF RECORDING PAPER | COLOR OF CHARACTER AND EFFECT |
|---|---|
| COLOR A | COLOR A1, COLOR A2 --- |
| COLOR B | COLOR B1, COLOR B2 --- |
| | |

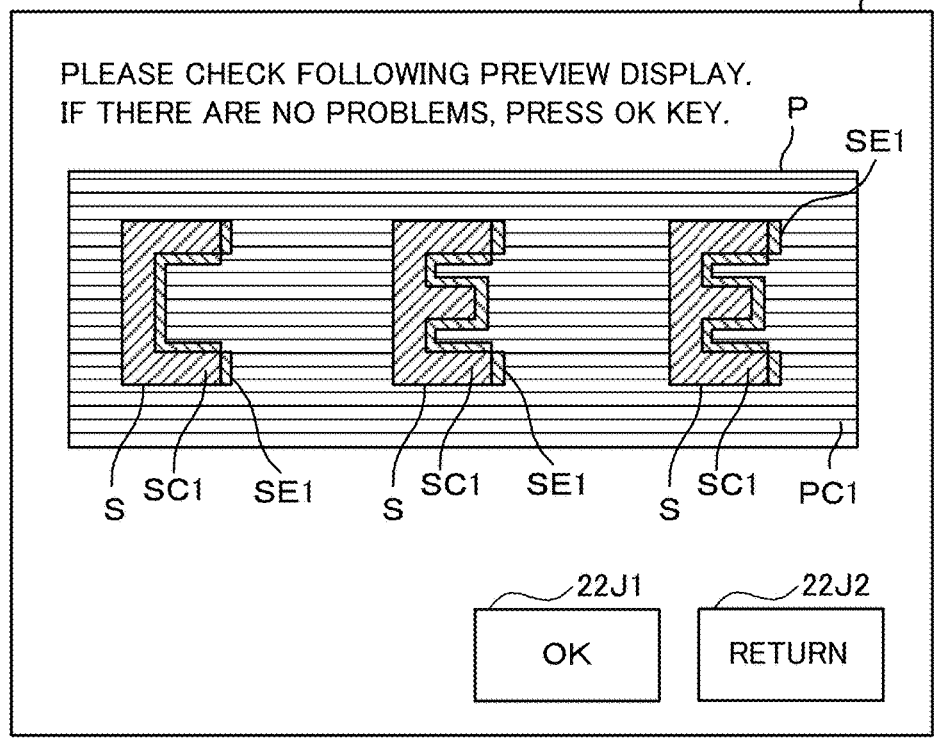
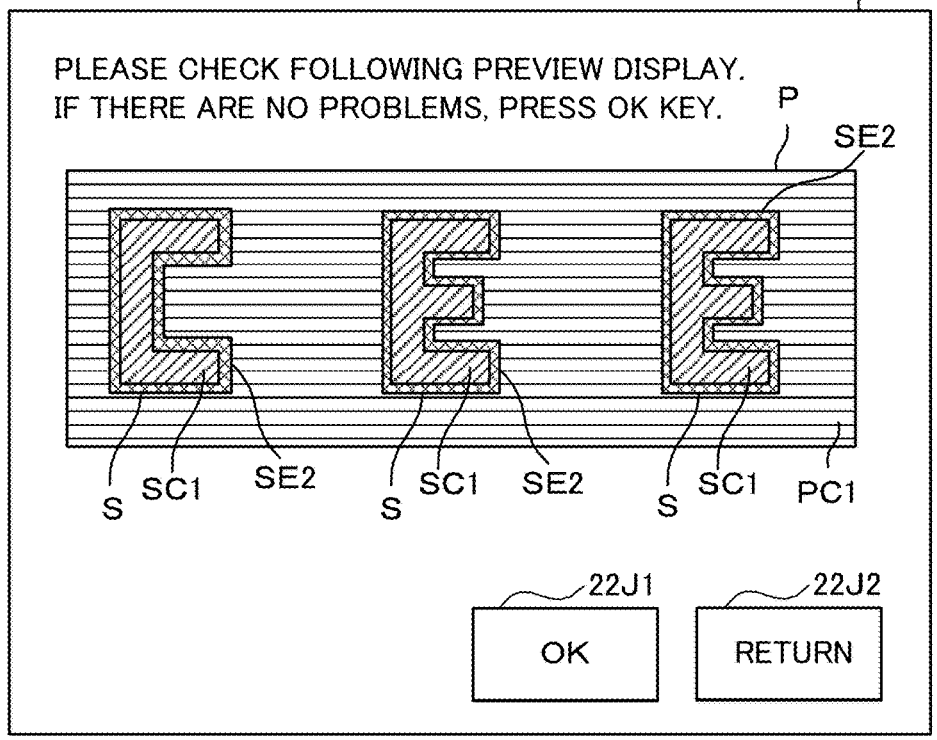

IMAGE FORMING DEVICE

Fig.24

| COLOR OF CHARACTER | EFFECT AND ITS COLOR |
|---|---|
| COLOR A | SHADOW, COLOR B2 |
| COLOR B | OUTLINE, COLOR A1 |
| | |

INFORMATION PROCESSING DEVICE AND IMAGE FORMING SYSTEM

INCORPORATION BY REFERENCE

This application claims priority to Japanese Patent Application No. 2017-054243 filed on Mar. 21, 2017, the entire contents of which are incorporated by reference herein.

BACKGROUND

The present disclosure relates to an information processing device connected to an image forming device via a network and an image forming system using the same, and particularly, to a technology in which, according to an operation of the information processing device, a color of a recording medium and a character color and an effect on the recording medium are designated, and the image forming device performs a printing process.

In an image forming system, a technology in which an information processing device such as a personal computer issues an instruction to the image forming device on a network and thus a printing process is performed in the image forming device has been proposed. With respect to an image forming device, the following technology has also been proposed: colored paper (recording medium) including a plurality of colors is read by a scanner, the read data is stored as background color data, and printing is performed with a character color being adjusted on the colored paper based on the background color data (hereinafter, "first technology" will be appropriately used to refer to the aforesaid).

In addition, for example, in an image forming device, there is a technology in which determination on whether a color of paper (recording medium) detected by a paper sensor is similar to a print color of image data is performed and when it is determined that they are similar to each other, control is performed so that the paper is changed or a process of changing the print color is performed. With respect to an image forming device, the following technology has also been proposed: it is determined whether the image data includes a character or a picture, and upon determination that the data includes a character, a saturation or a hue is changed so that it can be clearly distinguished from a color of paper and easily read, and upon determination that the data includes a picture, only the brightness is changed so that the mood of the picture is not disturbed (hereinafter, "second technology" will be appropriately used to refer to the aforesaid").

SUMMARY

As an aspect of the present disclosure, a technology further improved with respect to the above technology is proposed.

An information processing device according to an aspect of the present disclosure includes a display unit, an operation reception unit, a communication unit, a storage unit, a printer driver unit, and a communication control section. The operation reception unit receives an operation instruction from a user. The communication unit performs data communication with an image forming device via a network. The storage unit stores position information of a paper feed cassette of the image forming device and color information indicating a color of the recording medium accommodated in the paper feed cassette, in association with each other in advance. In the image forming device, a recording medium used for a printing process performed by the image forming device is accommodated. The printer driver unit creates, from document data to be subjected to the printing process that is received by the operation reception unit, a print job including printing target data created according to printing conditions received by the operation reception unit. The communication control section transmits the print job created by the printer driver unit from the communication unit to the image forming device via the network. When the operation reception unit receives the printing conditions, the printer driver unit causes the display unit to display an instruction for prompting the user to designate a color of the recording medium. When the operation reception unit receives designation of a color of the recording medium, the printer driver unit acquires position information of the paper feed cassette associated with color information indicating the designated color of the recording medium from the storage unit, adds, as a part of the printing conditions, a first command for instructing that the recording medium, which is accommodated in the paper feed cassette indicated by the position information of the paper feed cassette, be used in the printing process, and causes the display unit to display an instruction to perform at least one of designation of a character color of a character included in the document data to be subjected to the printing process on the recording medium for which the color has been designated and designation of a predetermined effect for the character and a color used for the effect. Furthermore, when the operation reception unit receives at least one of designation of the character color and designation of the effect and a color used for the effect, the printer driver unit adds, as a part of the printing conditions, a second command for instructing that the designated character color and the designated effect and color used for the effect be used in the printing process.

An image forming system according to another aspect of the present disclosure includes an information processing device and an image forming device connected to the information processing device via a network. The information processing device as described above is used as the information processing device. The image forming device includes: a plurality of the paper feed cassettes in which the recording medium is accommodated; a printing unit that performs a printing process on the recording medium; a reception unit that receives the print job from the information processing device; and a control section that causes the printing unit to perform a printing process based on the print job received by the reception unit.

BRIEF DESCRIPTION OF THE DRAWINGS

FIG. 9 is a diagram showing an example of a display screen displayed on the display unit of the information processing device.

FIG. 13 is a diagram showing an example of a prohibition table stored in an HDD of the information processing device.

FIG. 15A and FIG. 15B are diagrams showing an example of a display screen displayed on the display unit of the information processing device.

FIG. 24 is a diagram showing an example of an application table stored in an HDD of the information processing device according to the second embodiment.

DETAILED DESCRIPTION

Figure 1:
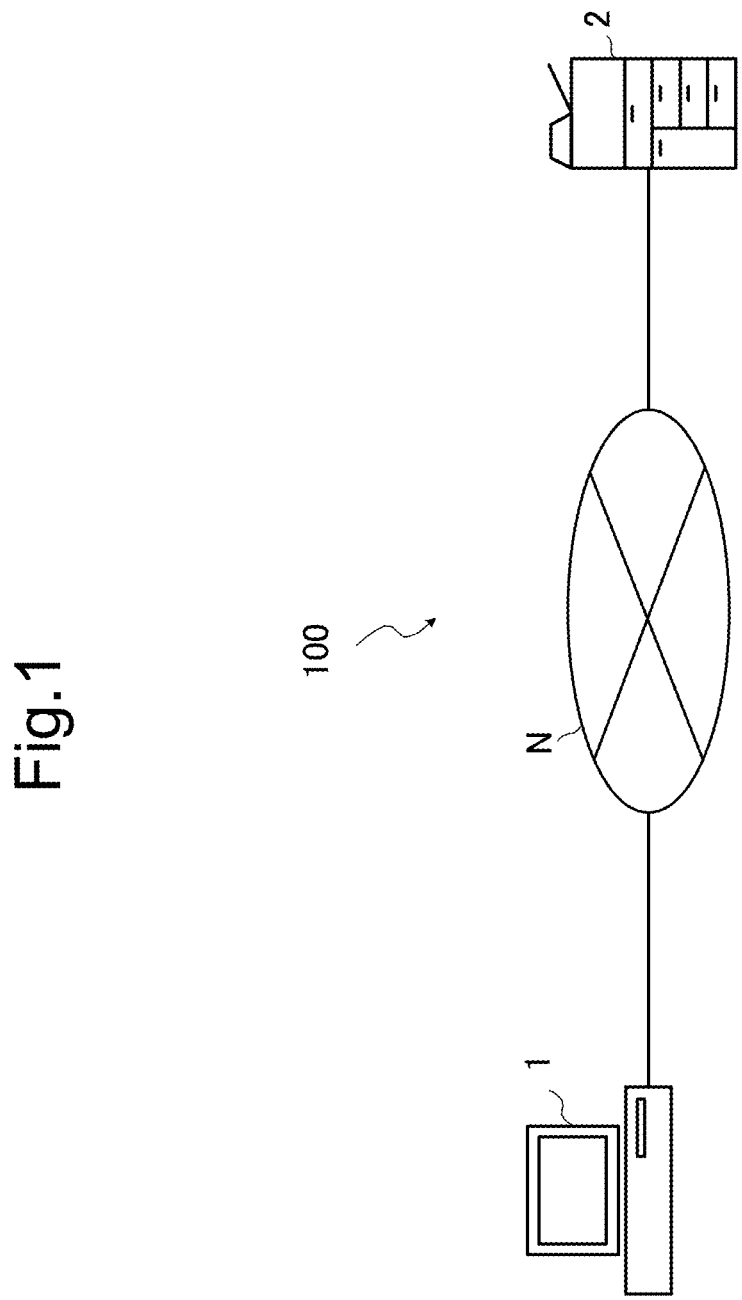
FIG. 1 is a diagram showing an entire image forming system according to an embodiment of the present disclosure.

An image forming system according to an embodiment of the present disclosure will be described below with reference to the drawings. FIG. 1 is a diagram showing the entire image forming system according to an embodiment of the present disclosure.

An image forming system 100 shown in FIG. 1 includes an information processing device 1 and an image forming device 2. In addition, in the image forming system 100, the information processing device 1 and the image forming device 2 transmit and receive data such as a print job and messages via a network N, for example, an intranet and the Internet.

Figure 2:
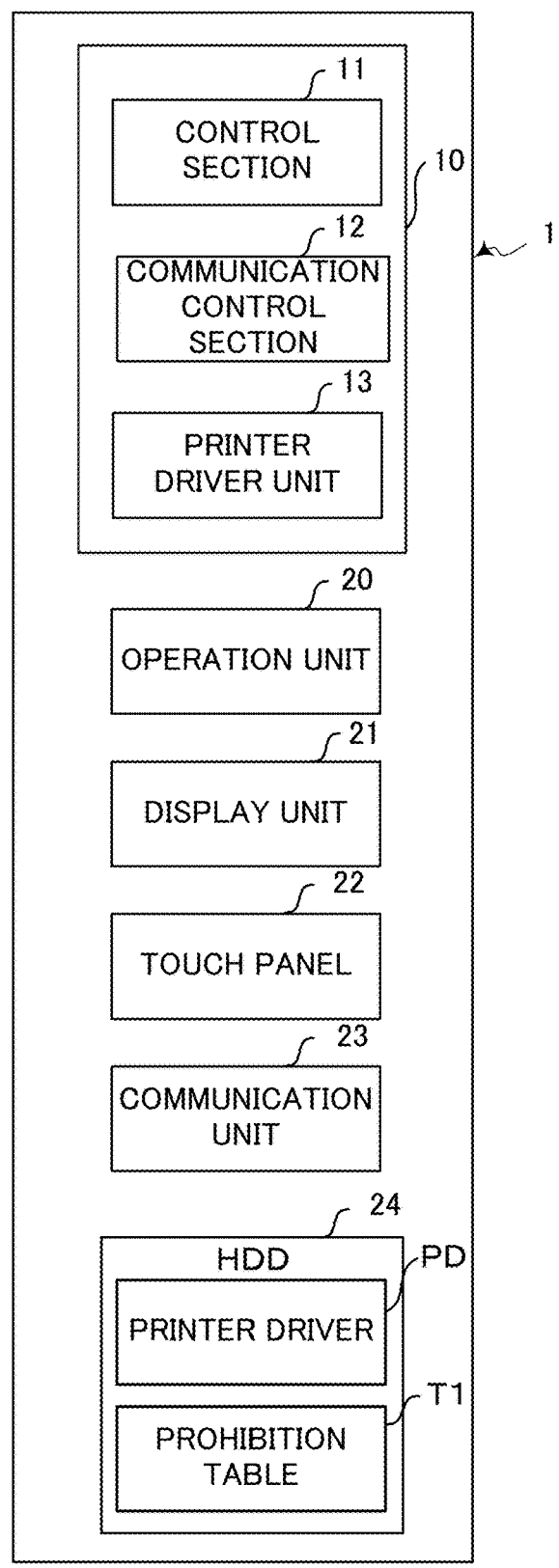
FIG. 2 is a functional block diagram showing a configuration of main parts of an information processing device.

Here, the information processing device 1 will be described in detail with reference to FIG. 2. FIG. 2 is a functional block diagram showing a configuration of main parts of the information processing device.

The information processing device 1 is a mobile information terminal, such as a smartphone or a tablet PC, or a personal computer. The information processing device 1 includes a control unit 10, an operation unit 20, a display unit 21, a touch panel 22, a communication unit 23, and an HDD 24. Such units can transmit and receive data or signals through a CPU bus. The control unit 10 includes a processor, a random access memory (RAM), and a read only memory (ROM). The processor is, for example, a central processing unit (CPU), an MPU, or an ASIC. When a print request program stored in the HDD 24 or the like is executed by the processor, the control unit 10 functions as a control section 11 and a communication control section 12. Here, the control section 11 and the communication control section 12 of the control unit 10 each may be formed by a hard circuit independently of an operation based on the print request program. Unless otherwise specified, this similarly applies to respective embodiments. In addition, when the processor executes a printer driver PD stored in the HDD 24, the control unit 10 functions as a printer driver unit 13.

The control section 11 controls overall operations of the information processing device 1.

The communication control section 12 has a function of controlling a communication operation of the communication unit 23. In addition, the communication control section 12 transmits a print job created by the printer driver unit 13 from the communication unit 23 to the image forming device 2 via the network N.

In addition, the control section 11 reads document data stored in the HDD 24 or document data from outside the information processing device 1, for example, a server (not shown) connected to the communication unit 23 via the network N, according to an operation on the operation unit 20 or the touch panel 22 by a user.

The document data is, for example, a file and the like created in applications such as a word processor, spreadsheet software, and drawing software executed in the information processing device 1. However, the document data is data with a format that is not suitable for the image forming device 2 and printing, and cannot be directly used in a printing process performed by the image forming device 2.

The printer driver unit 13 converts document data designated by the user into data generated in a printer language suitable for the image forming device 2 according to an operation instruction from the user that has been received by an operation reception unit to be described below (for example, the operation unit 20 and the touch panel 22), and creates a print job (for example, a PRN file) including printing target data created according to printing conditions designated by the user using the converted data generated in a printer language.

In addition, when the operation reception unit receives printing conditions, the printer driver unit 13 may cause the display unit 21 to display an instruction for prompting the user to designate a color of recording paper (recording medium). In addition, when the operation reception unit receives a designated color of recording paper, the printer driver unit 13 acquires position information of paper feed cassettes (to be described below) of the image forming device 2 associated with color information indicating the designated color of recording paper from the HDD 24, and adds, as a part of the printing conditions, a first command for instructing that the recording paper accommodated in the paper feed cassettes indicated by the acquired position information of the paper feed cassettes be used in the printing process.

In addition, the printer driver unit 13 may cause the display unit 21 to display an instruction for prompting the user to designate at least one of a character color of a character included in the document data to be subjected to the printing process for the recording paper for which the color has been designated and a predetermined effect for the character included in the document data to be subjected to the printing process and a color used for the effect for the recording paper for which the color has been designated. In addition, when the operation reception unit receives at least one of designation of a character color and designation of an effect and a color used for the effect, the printer driver unit 13 adds, as a part of the printing conditions, a second command for instructing that the designated character color and the designated effect and color used for the effect be used in the printing process. For example, when the operation reception unit receives designation of a character color, the printer driver unit 13 changes a character color designated in the document data to the designated character color, and then converts it into data generated in a printer language, and thus adds the second command as a part of the printing conditions. Incidentally, the operation reception unit may receive a color designation for a predetermined monochromatic color or designation of predetermined graduated colors as the designation of a character color and the designation of a color used for an effect. In addition, the operation reception unit may receive at least one of adding a shadow to the character to which an effect is added and adding an outline to the character to which an effect is added as the designation of an effect.

In addition, before the printer driver unit 13 causes the display unit 21 to display an instruction for prompting the user to designate at least one of designation of a character color and designation of a predetermined effect and a color used for the effect, the printer driver unit 13 may cause the display unit 21 to display an instruction for prompting the user to designate a range of the character to be designated in document data to be subjected to the printing process for the recording paper for which the color has been designated.

In addition, when the operation reception unit receives at least one of designation of a character color and designation of an effect and a color used for the effect, the printer driver unit 13 may cause the display unit 21 to display an image of a character sample on an image of the recording paper displayed in the designated color of the recording paper for which the color has been designated and display a preview of an image to which the designated character color and the designated effect and color used for the effect are added to the image of the character sample.

In addition, when the operation reception unit receives at least one of designation of a color of recording paper and at least one of designation of a character color and designation of a color used for an effect, the printer driver unit 13 refers to a prohibition table stored in the HDD 24, and when it is determined that the designated color of recording paper and the designated character color or the designated color used for the effect are shown in the prohibition table, may cause the display unit 21 to display a message indicating that the designated color of recording paper and the designated character color and the designated color used for the effect have been rejected.

The operation unit 20 includes, for example, a keyboard including hard keys, a mouse, and a pointing device. The user inputs an instruction for designating document data to be subjected to the printing process, printing conditions, and the like to the operation unit 20.

The display unit 21 is formed of a liquid crystal display, an organic EL display, or the like. The display unit 21 displays an instruction input screen for printing conditions of a printing process in the image forming device 2 under control of the control section 11.

The touch panel 22 is disposed on the front surface of the display unit 21. The touch panel 22 is a touch panel of a so-called resistive film type, an electrostatic capacitive type, or the like, and detects contact (touch) by the user on the touch panel 22 together with a contact position thereof. When the touch panel 22 detects contact by the user, the touch panel 22 outputs a detection signal indicating a coordinates position of the contact point to the control section 11. Here, the operation unit 20 and the touch panel 22 are examples of the operation reception unit in the scope of the claims.

The communication unit 23 includes a communication module such as a LAN board, and transmits and receives various types of data to and from the image forming device 2 and the like via the network N connected to the communication unit 23 under control of the communication control section 12 and the like.

The hard disk drive (HDD) 24 is a large capacity storage device in which applications, document data created in the applications, and the like are stored. In addition, the printer driver PD is stored in the HDD 24 in advance. In addition, in the HDD 24, position information of paper feed cassettes (to be described below) of the image forming device 2 and color information indicating a color of the recording paper accommodated in the paper feed cassettes are stored in association with each other in advance. In addition, in the HDD 24, a prohibition table T1 showing combination relationships between a color of the recording paper and the character color and a color used for the effect that have been determined to be prohibited in advance is stored in advance. Here, the HDD 24 is an example of a storage unit in the scope of the claims.

Figure 3:
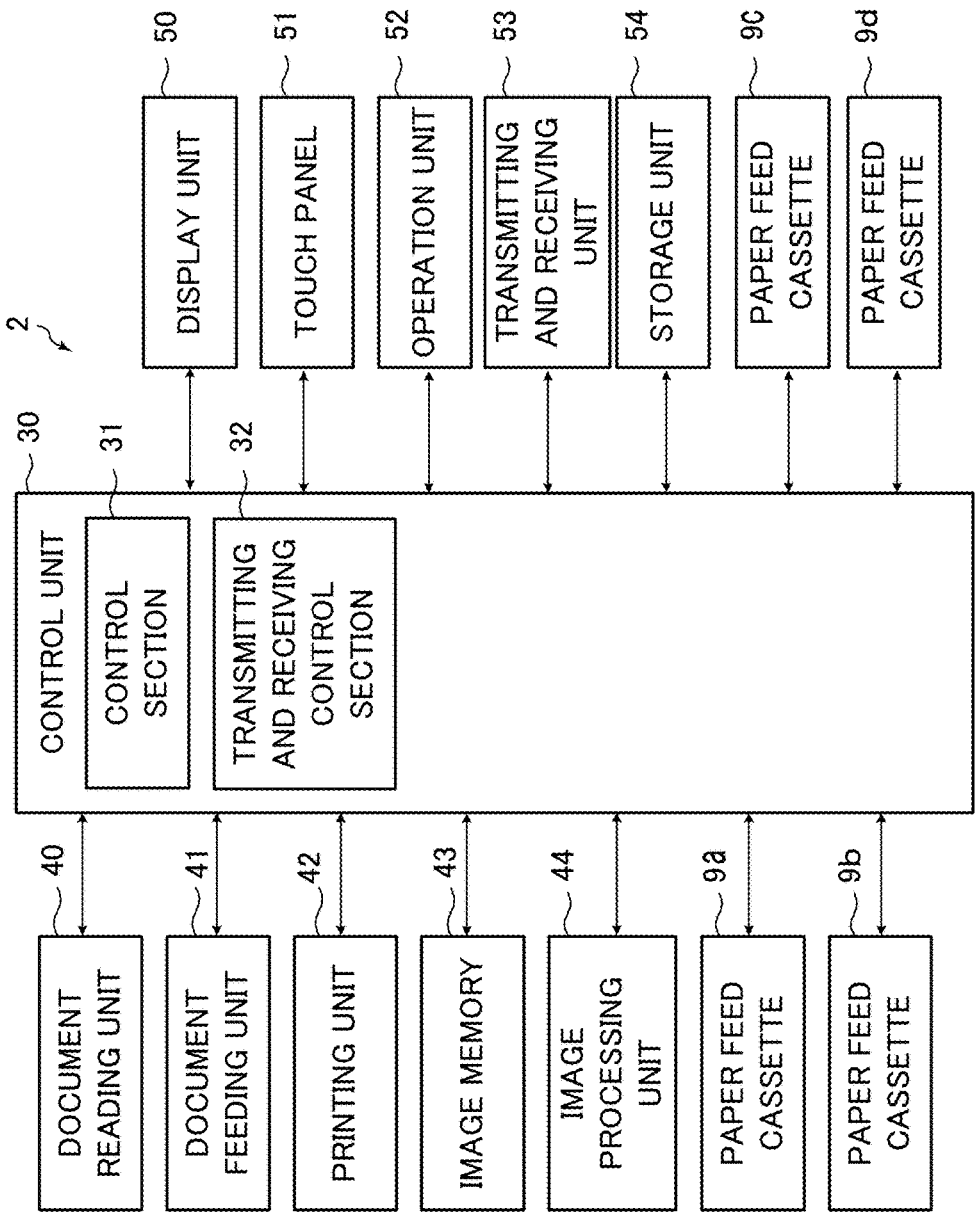
FIG. 3 is a functional block diagram showing a configuration of main parts of an image forming device.

Next, an image forming device 3 of the present embodiment will be described in detail with reference to FIG. 3. FIG. 3 is a functional block diagram showing a configuration of main parts of the image forming device.

As shown in FIG. 3, the image forming device 2 is a multi-function machine having a plurality of functions, for example, a copy function, a printer function, a scanner function, and a facsimile function. The image forming device 2 includes a control unit 30. The control unit 30 includes a CPU, a RAM, a ROM, a dedicated hardware circuit, and the like and controls overall operations of the image forming device 2.

In addition, the image forming device 2 includes a document reading unit 40, a document feeding unit 41, a printing unit 42, an image memory 43, an image processing unit 44, a display unit 50, a touch panel 51, an operation unit 52, a transmitting and receiving unit 53, a storage unit 54, and a plurality of paper feed cassettes, for example, four paper feed cassettes 9a, 9b, 9c, and 9d.

When the image forming device 2 performs a document reading operation, the document reading unit 40 optically reads an image of a document fed by the document feeding unit 41 and the like and generates image data.

When the image forming device 2 performs an image forming operation (that is, a printing operation), a control section (to be described below) of the control unit 30 may cause the printing unit 42 to perform a printing process on the recording paper as a recording medium fed from the paper feed cassettes 9a to 9d and the like, and form an image on the recording paper based on the image data generated by the document reading operation, a print job from the information processing device 1, and the like.

The document reading unit 40 includes a reading mechanism (not shown) including a light emission unit, a CCD sensor, and the like under control of the control unit 30. When the light emission unit emits light to a document and the CCD sensor receives reflected light thereof, the document reading unit 40 reads an image from the document and generates image data.

The image memory 43 is an area in which image data of the document image obtained by reading in the document reading unit 40 is temporarily stored and data for a printing process to be printed by the printing unit 42 is temporarily stored.

The image processing unit 44 reads the image read by the document reading unit 40 from the image memory 43 and performs image processing. For example, the image processing unit 44 performs predetermined image processing such as shading correction in order to improve a quality of the image read by the document reading unit 40 after the image is formed by the printing unit 42.

The printing unit 42 performs image formation from image data read by the document reading unit 40, a print job from the information processing device 1, and the like. Specifically, when the printing unit 42 performs, for example, color printing, a magenta image forming unit, a cyan image forming unit, a yellow image forming unit, and a black image forming unit of the printing unit 42 form toner images on a photosensitive drum according to charging, exposure, and development processes based on an image formed of color components constituting the printing data and transfer the toner images onto an intermediate transfer belt using a primary transfer roller (not shown).

The toner images in the colors transferred onto the intermediate transfer belt are superimposed on the intermediate transfer belt at transfer timings that are adjusted and form a color toner image. A secondary transfer roller transfers the color toner image formed on the surface of the intermediate transfer belt to recording paper transported through a transport path from the paper feeding unit at a nip part of a drive roller with the intermediate transfer belt therebetween (not shown). Then, a fixing unit fixes the toner image on the recording paper to the recording paper by thermocompression bonding (not shown). The recording paper on which the fixing process is completed and the color image is formed is discharged to a discharge tray (not shown).

The display unit 50 is formed of a liquid crystal display, an organic EL display, or the like.

The touch panel 51 is disposed on the front surface of the display unit 50. The touch panel 51 is a touch panel of a so-called resistive film type, an electrostatic capacitive type, or the like, and detects contact (touch) by the user on a touch panel 51 together with a contact position thereof. When the touch panel 51 detects contact by the user, the touch panel 51 outputs a detection signal indicating a coordinates position of the contact point to a control section 31 to be described below.

The operation unit 52 includes hard keys, for example, a menu key calling up a menu, an arrow key for moving a focus of a GUI that constitutes the menu, and a decision key for performing a confirmation operation on the GUI that constitutes the menu.

The transmitting and receiving unit 53 includes a communication module such as a LAN board, and performs communication of various types of data to the information processing device 1 and the like via the network N connected to the transmitting and receiving unit 53 under control of a transmitting and receiving control section 32 to be described below and the like. Incidentally, the transmitting and receiving unit 53 is an example of a reception unit in the scope of the claims.

The storage unit 54 is a large capacity storage device such as a hard disk drive (HDD), a solid state drive (SSD), or the like.

In the paper feed cassettes 9a to 9d, the recording paper used for a printing process in the image forming device 2 is accommodated. In addition, in these paper feed cassettes 9a to 9d, recording paper in different colors is accommodated. In addition, color information indicating colors of the recording paper accommodated in the paper feed cassettes 9a to 9d is associated with position information indicating positions of the paper feed cassettes 9a to 9d in which the recording paper is accommodated, and is stored in the HDD 24 of the information processing device 1 in advance. Here, the paper feed cassettes 9a to 9d correspond to paper feed cassettes in the scope of the claims.

The control unit 30 includes a CPU, a ROM, a RAM, and the like and controls overall operations of the image forming device 3. The control unit 30 includes the control section 31 and the transmitting and receiving control section 32.

The control unit 30 includes a processor, a random access memory (RAM), and a read only memory (ROM). The processor is, for example, a central processing unit (CPU), an MPU, or an ASIC. When a print execution program stored in the storage unit 54 or the like is executed by the processor, the control unit 30 functions as the control section 31 and the transmitting and receiving control section 32. Here, the control section 31 and the transmitting and receiving control section 32 each may be formed by a hard circuit independently of an operation based on the print execution program. Unless otherwise specified, this similarly applies to respective embodiments.

The control section 31 controls overall operations of the image forming device 2, and is connected to the document reading unit 40, the document feeding unit 41, the printing unit 42, the image memory 43, the image processing unit 44, the display unit 50, the touch panel 51, the operation unit 52, the transmitting and receiving unit 53, the storage unit 54, and the paper feed cassettes 9a to 9d, and performs drive control of these units.

The transmitting and receiving control section 32 has a function of controlling a communication operation of the transmitting and receiving unit 53.

Next, operations of the image forming system 100 of the present embodiment will be described in detail with reference to FIG. 4 to FIG. 22.

Figure 4:
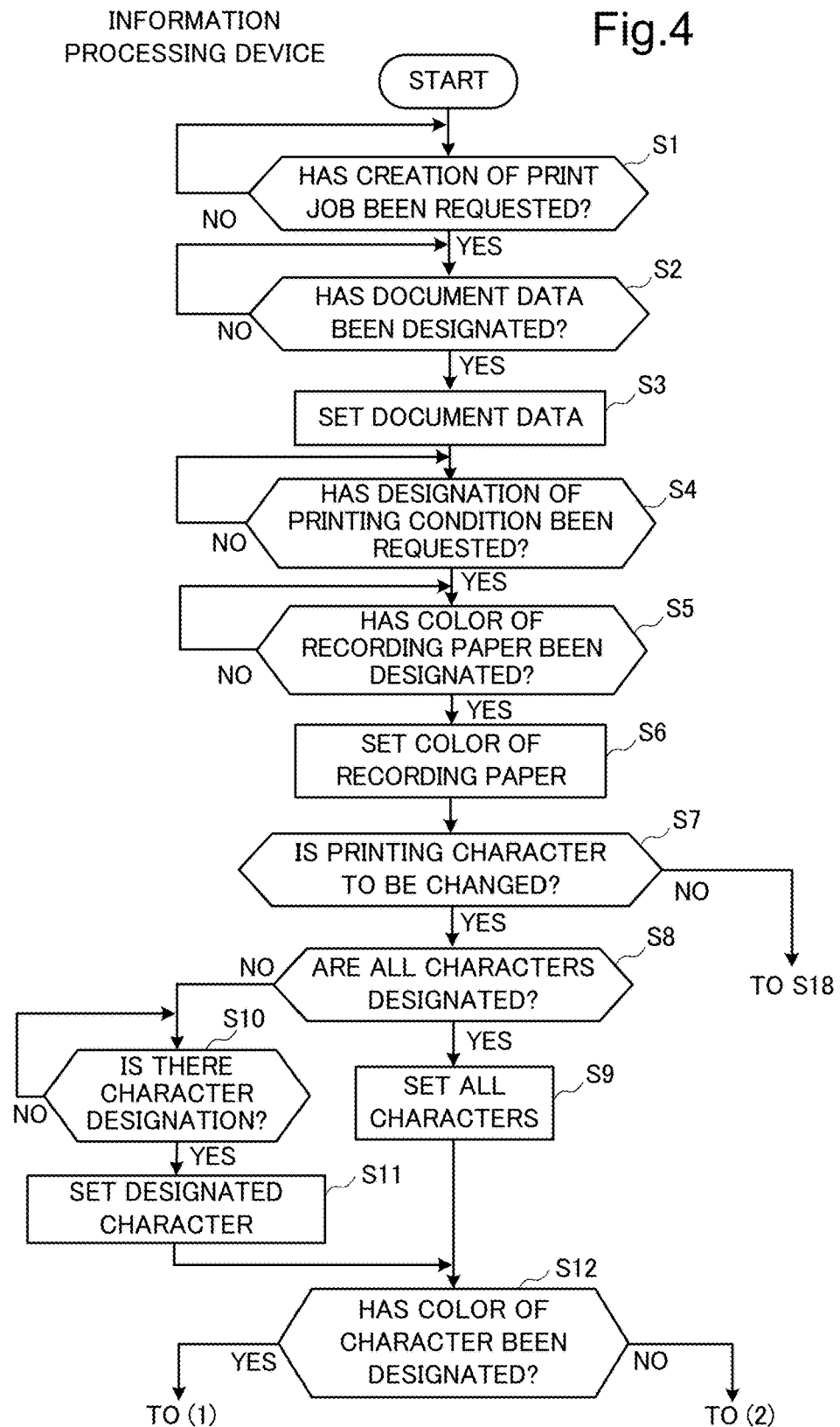
FIG. 4 is a flowchart showing a flow of processes performed by the information processing device.
Figure 5:
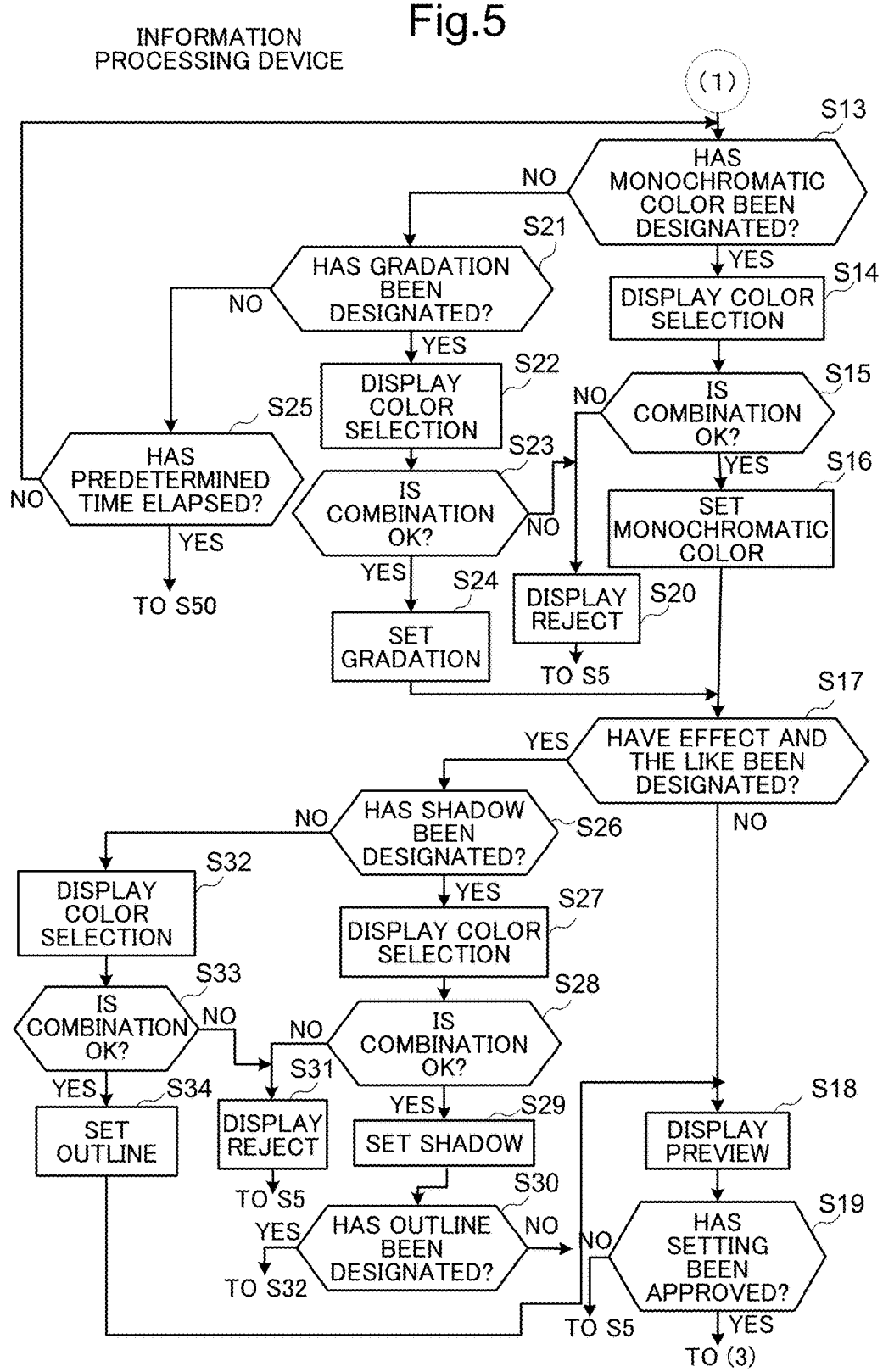
FIG. 5 is a flowchart showing the process from (1) shown in FIG. 4.
Figure 6:
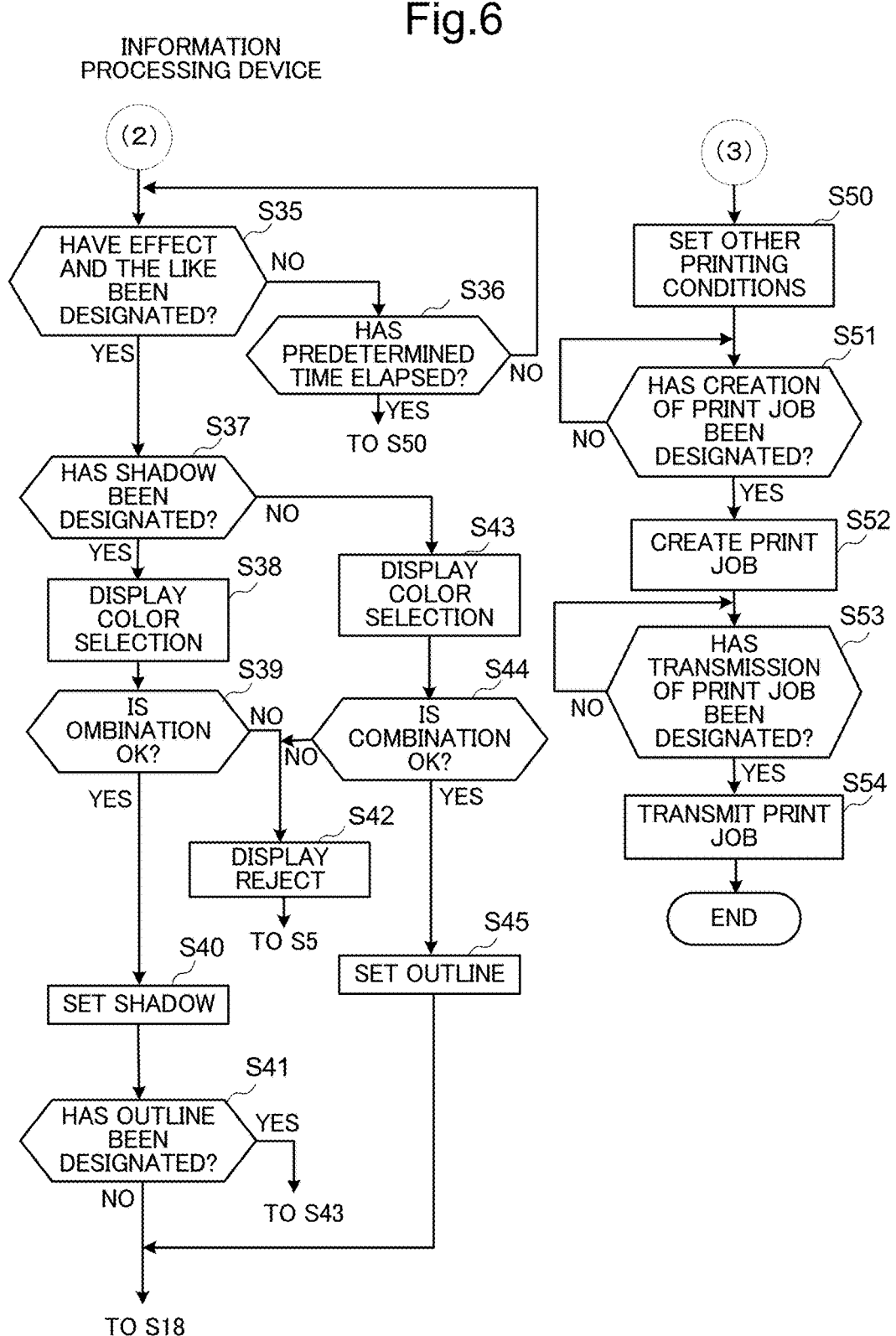
FIG. 6 is a flowchart showing the process from (2) shown in FIG. 4 and the process from (3) shown in FIG. 5.

First, operations of the information processing device 1 of the present embodiment will be described in detail with reference to FIG. 4 to FIG. 6. FIG. 4 is a flowchart showing a flow of processes performed by the information processing device. FIG. 5 is a flowchart showing the process from (1) shown in FIG. 4. FIG. 6 is a flowchart showing the process from (2) shown in FIG. 4 and the process from (3) shown in FIG. 5.

The control section 11 determines whether the operation reception unit has received an instruction to create a print job from the user (S1). For example, when the control section 11 causes the display unit 21 to display a print job create key (not shown), the control section 11 detects whether the print job create key has been selected by the user, and thus determines whether an instruction to create a print job has been requested. When selection of the print job create key is not detected by the touch panel 22 (NO in S1), the process does not proceed to S2, and the control section 11 puts the information processing device 1 in a standby state.

Figure 7:
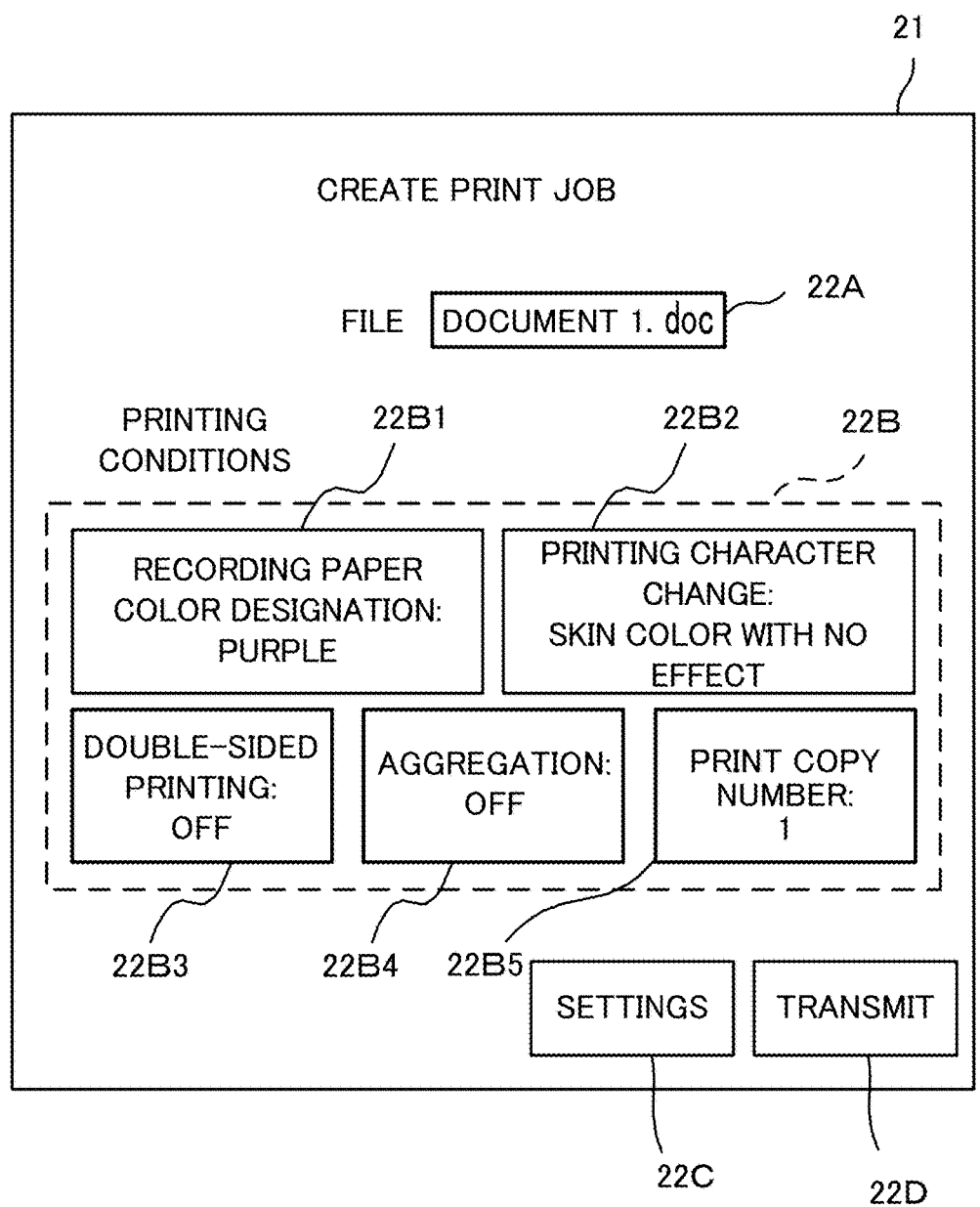
FIG. 7 is a diagram showing an example of a display screen displayed on a display unit of an information processing device.

On the other hand, when it is detected that the print job create key has been selected by the user and the selection is received by the touch panel 22 (YES in S1), the control section 11 determines whether document data to be subjected to the printing process has been designated by the user (S2). For example, as shown in FIG. 7, the control section 11 may cause the display unit 21 to display an instruction for prompting the user to designate document data to be subjected to the printing process, for example, a designation field 22A for designating document data to be subjected to the printing process. Then, when the touch panel 22 does not detect a designation in the designation field 22A (NO in S2), the process does not proceed to S3, and the control section 11 puts the information processing device 1 in a standby state.

On the other hand, when it is detected that there has been a designation by the user in the designation field 22A and the designation is received by the touch panel 22 (YES in S2), the control section 11 determines that a process of designating the document data has been requested. Then, the control section 11 may cause the display unit 21 to display a file name of document data stored in the HDD 24 in advance, for example, "document 1.doc," "document 2.doc," and "document 3.doc" (not shown). Then, for example, when it is detected that "document 1.doc" has been designated by the user and the designation is received by the touch panel 22, the control section 11 sets the document data of the "document 1.doc" as the designated document data (S3). Then, as shown in FIG. 7, the control section 11 may cause the display unit 21 to display the file name of "document 1.doc" of the designated document data in the designation field 22A.

Then, the control section 11 determines whether designating printing conditions in the printing process has been requested by the user (S4). For example, as shown in FIG. 7, the control section 11 may cause the display unit 21 to display condition setting keys 22B for setting printing conditions, for example, a recording paper color designation key 22B1, a printing character change key 22B2, a double-sided printing key 22B3, a page aggregation key 22B4, and a print copy number key 22B5. Then, when the touch panel 22 detects that none of the condition setting keys 22B has been selected (NO in S4), the process does not proceed to S5, and the control section 11 puts the information processing device 1 in a standby state.

Figure 8:
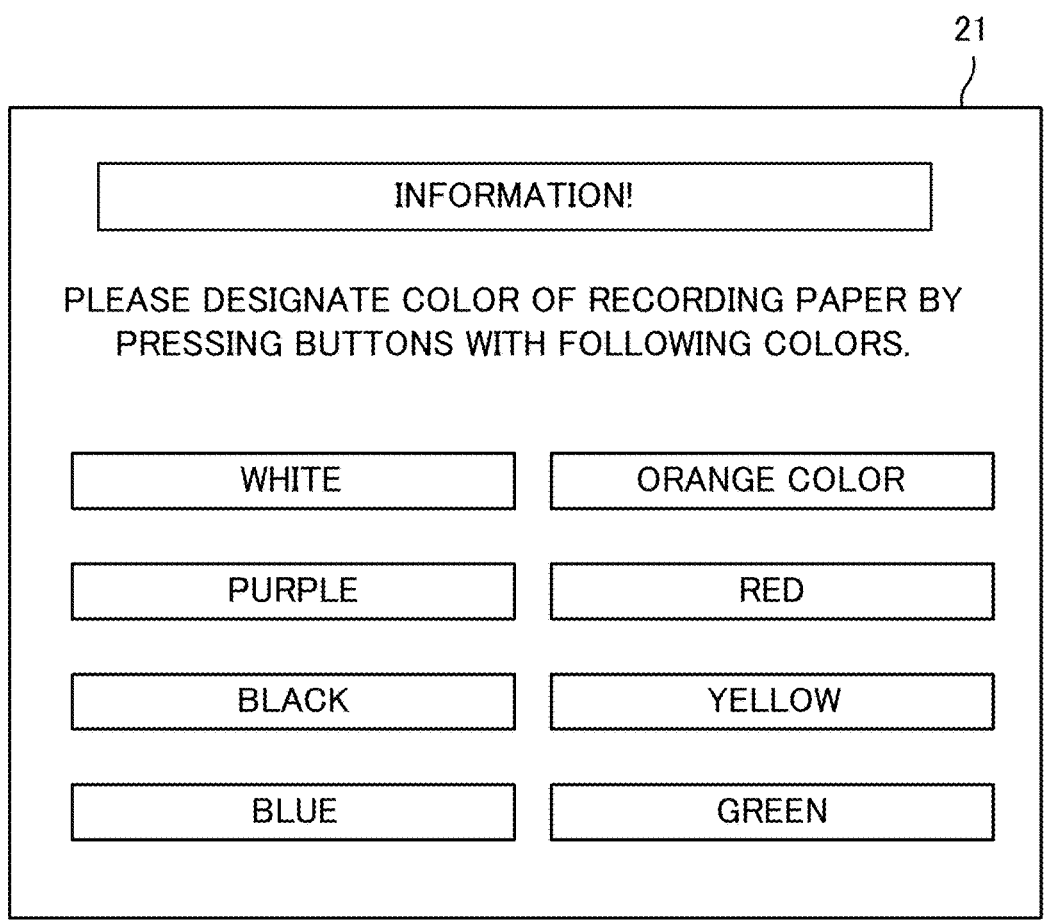
FIG. 8 is a diagram showing an example of a display screen displayed on the display unit of the information processing device.

On the other hand, when it is detected that the condition setting keys 22B have been selected by the user and the selection is received by the touch panel 22 (YES in S4), the control section 11 determines that designation of the printing conditions has been requested. Then, the printer driver unit 13 determines whether designating a color of recording paper has been requested by the user (S5). For example, as shown in FIG. 8, the printer driver unit 13 may cause the display unit 21 to display an instruction for prompting the user to designate a color of recording paper. Then, when it is not detected by the touch panel 22 that a button for a designated color of recording paper has been selected (NO in S5), the process does not proceed to S6 and the printer driver unit 13 puts the information processing device 1 in a standby state.

On the other hand, when it is detected that a button for a designated color of recording paper, for example, a purple button shown in FIG. 8, has been selected and the selection is received by the touch panel 22, the printer driver unit 13 sets use of purple recording paper as a printing condition (S6). That is, the printer driver unit 13 acquires position information of the paper feed cassette associated with color information indicating the designated purple recording paper, for example, the paper feed cassette 9c, from the HDD 24, and adds, as a part of the printing conditions, a first command for instructing that the purple recording paper accommodated in the paper feed cassette 9c indicated by the acquired position information of the paper feed cassette 9c be used in the printing process. Then, as shown in FIG. 7, the printer driver unit 13 may cause the display unit 21 to display the designation of "purple" on a display part of the recording paper color designation key 22B1. Incidentally, when the designated color is not in the paper feed cassettes 9a to 9d, the printer driver unit 13 may cause the display unit 21 to display, for example, an instruction for prompting the user to redesignate a color or put recording paper in the designated color into any of the paper feed cassettes.

Then, the printer driver unit 13 determines whether designation for changing the printing character for the characters included in document data with the file name "document 1.doc" set in S3 has been requested (S7). That is, the printer driver unit 13 determines whether to change printing conditions designated for document data, for example, conditions of the color black with no effects (shadow or outline), for the printing characters to be printed by the image forming device 2. For example, the printer driver unit 13 may determine whether the designation for changing the printing character has been requested by detecting whether the printing character change key 22B2 shown FIG. 7 has been selected by the user. When it is not detected that the printing character change key 22B2 on the touch panel 22 has been selected (NO in S7), the printer driver unit 13 determines that a printing process will be performed in the color black with no effects (shadow or outline), and the process proceeds to S18 to be described below.

On the other hand, when it is detected that the printing character change key 22B2 has been selected by the user and the selection has been received by the touch panel 22 (YES in S7), the printer driver unit 13 determines that the change in the printing character for the characters included in document data with the file name "document 1.doc" has been requested. Then, the printer driver unit 13 determines whether all characters of the document data has been designated as a printing character change range in the document data (S8). For example, as shown in FIG. 9, the printer driver unit 13 may cause the display unit 21 to display the printing character change range, that is, designate the range of the characters for which a character color is to be designated and a predetermined effect and a color used for the effect are to be designated. Then, the printer driver unit 13 determines whether the designation for changing the printing character for all characters included in the document data has been requested by detecting whether a button for changing all characters shown in FIG. 9 has been selected by the user. When it is detected that the button for changing all characters has been selected by the user and the selection is received by the touch panel 22 (YES in S8), the printer driver unit 13 sets the printing character to be changed for all characters included in the document data (S9). Then, the process proceeds to S12 to be described below.

Figure 10:
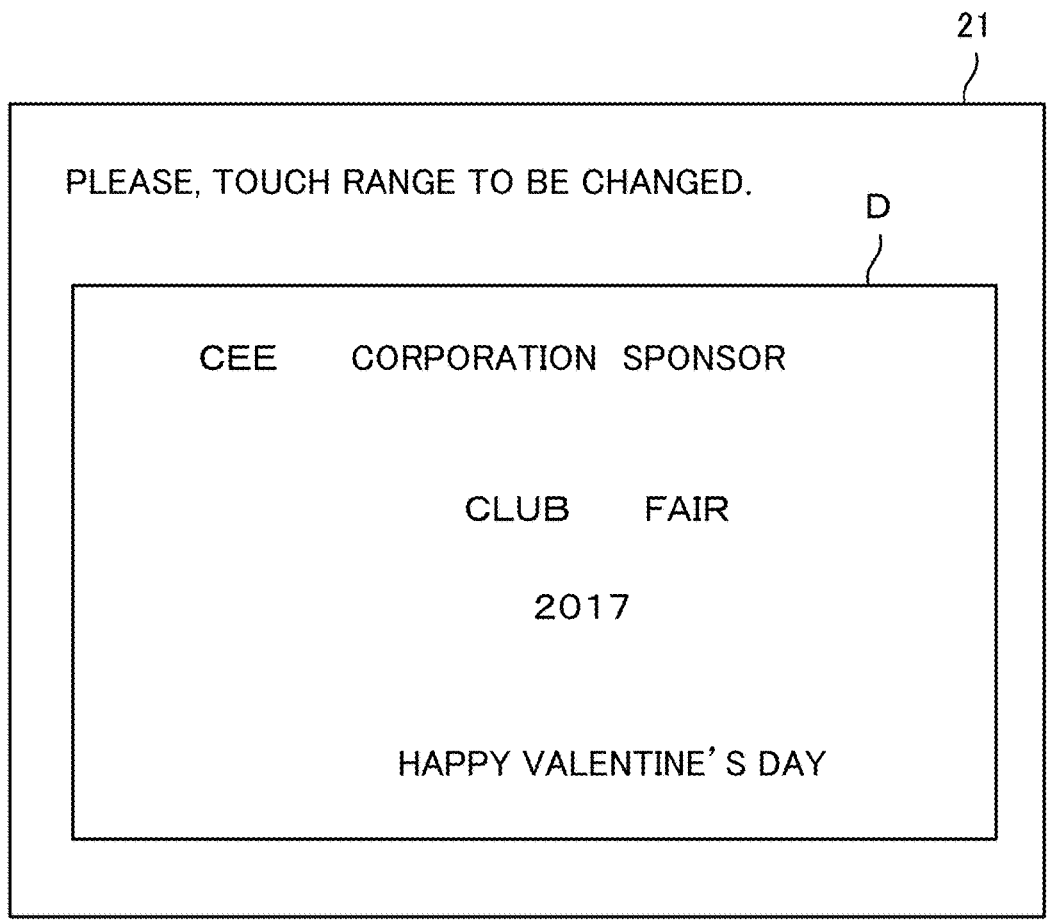
FIG. 10 is a diagram showing an example of a display screen displayed on the display unit of the information processing device.

On the other hand, when it is detected that a button for designating a change character has been selected by the user on a display screen shown in FIG. 9 and the selection is received by the touch panel 22 (NO in S8), the printer driver unit 13 determines that the printing character is to be changed for some characters (specific character) included in the document data. Then, for example, as shown in FIG. 10, the printer driver unit 13 may cause the display unit 21 to display printed matter D of the document data, prompts the user to designate (a range of) characters for which the printing character is to be changed, and determines whether (a range of) characters for which the printing character is to be changed has been designated (S10). Then, when no characters in the printed matter D displayed on the display unit 21 has been designated (NO in S10), the process does not proceed to S11, and the printer driver unit 13 puts the information processing device 1 in a standby state.

On the other hand, when it is detected that characters for which the printing character is to be changed, for example, the characters "C," "E," and "E," has been designated by the user on a display screen shown in FIG. 10 and the selection is received by the touch panel 22 (YES in S10), the printer driver unit 13 sets the characters "C," "E," and "E" as being designated as characters for which the printing character is to be changed (S11), and the process proceeds to S12. In this manner, in the present embodiment, since the display screen shown in FIG. 9 is displayed on the display unit 21, the user is prompted to designate a range of characters for which the printing character is to be changed. Therefore, the user can easily select characters for which the printing character is to be changed and it is possible to easily obtain printed matter printed with desired the printing character.

In addition, the printer driver unit 13 determines whether designating a character color for characters for which the printing character is to be changed has been requested (S12). For example, as shown in a display screen in FIG. 11, the printer driver unit 13 may cause the display unit 21 to display a check field 22E1 for displaying an image showing that an operation by the user is able to be performed so that the user can designate a predetermined monochromatic color as a color of the printing character. Similarly, as shown in the display screen in FIG. 11, the printer driver unit 13 may cause the display unit 21 to display a check field 22E2 for displaying an image showing that an operation by the user is able to be performed so that the user can designate predetermined graduated colors as colors of the printing character. Similarly, as shown in the display screen in FIG. 11, the printer driver unit 13 may cause the display unit 21 to display a check field 22E3 for displaying an image showing that an operation by the user is able to be performed so that the user can designate an effect for the printing character, that is, adding a shadow to characters to which the effect is added. Similarly, as shown in the display screen in FIG. 11, the printer driver unit 13 may cause the display unit 21 to display a check field 22E4 for displaying an image showing that an operation by the user is able to be performed so that the user can designate an effect for the printing character, that is, adding an outline to characters to which the effect is added.

Figure 11:
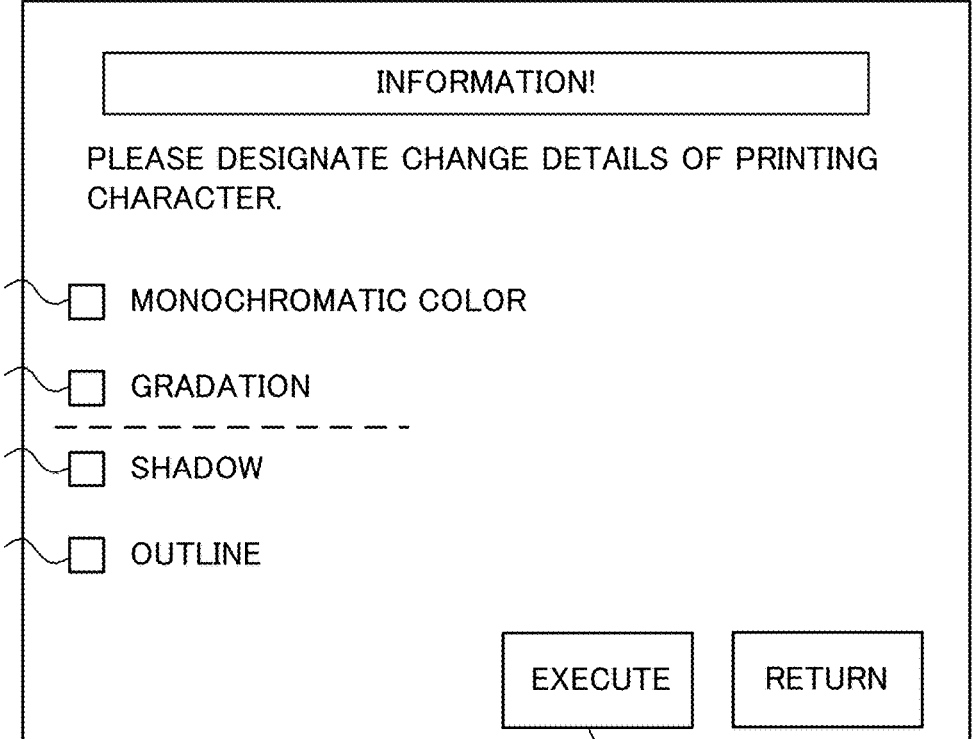
FIG. 11 is a diagram showing an example of a display screen displayed on the display unit of the information processing device.

Incidentally, when it is detected that the user has selected the monochromatic color check field 22E1 and the graduated color check field 22E2 at the same time on the display screen in FIG. 11, the selection is received by the touch panel 22, and additionally, an execute key 22F is selected, and the selection is received by the touch panel 22, since it is not possible to change to a monochromatic color and a graduated color at the same time regarding a color of the printing character, the printer driver unit 13 invalidates designation of the monochromatic color check field 22E1 and the graduated color check field 22E2, and may cause the display unit 21 to display an instruction to redesignate a character color (not shown). In addition, when it is detected that the has selected the shadow check field 22E3 and the outline check field 22E4 at the same time on the display screen in FIG. 11 and the selection is received by the touch panel 22, and additionally, the execute key 22F is selected and the selection is received by the touch panel 22, the printer driver unit 13 applies both effects, adding a shadow and adding an outline, to the printing character, at the same time.

Then, the printer driver unit 13 determines whether designating a character color to change for the printing character has been requested by detecting whether the monochromatic color check field 22E1 or the graduated color check field 22E2 has been selected by the user on the display screen in FIG. 11, and additionally, the execute key 22F has been selected by the user. When it is detected by the touch panel 22 that neither the monochromatic color check field 22E1 nor the graduated color check field 22E2 has been selected, that is, when it is detected that the shadow check field 22E3 or the outline check field 22E4 has been selected and the selection is received by the touch panel 22, and additionally, the execute key 22F is selected and the selection is received by the touch panel 22 (NO in S12), the printer driver unit 13 determines that application of an effect for the printing character has been requested, and the process proceeds to S35 to be described below.

Figure 12:
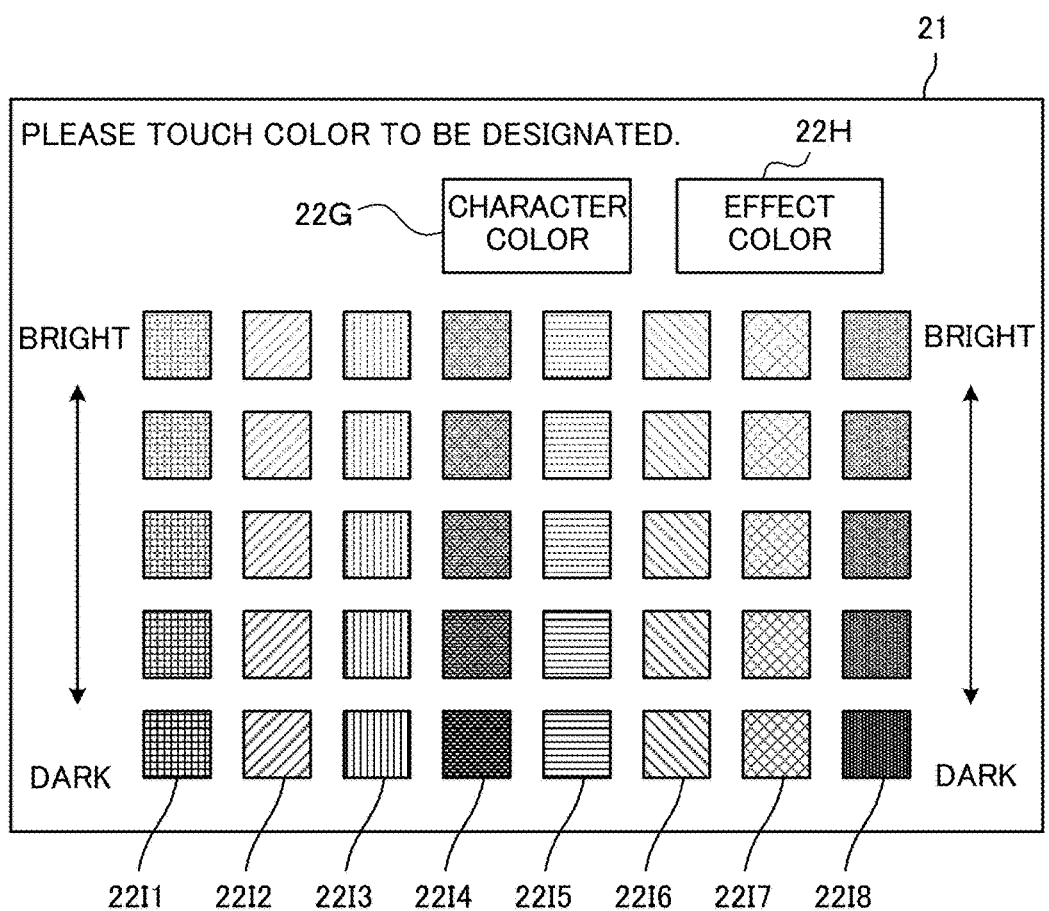
FIG. 12 is a diagram showing an example of a display screen displayed on the display unit of the information processing device.

On the other hand, when it is detected that the monochromatic color check field 22E1 or the graduated color check field 22E2 has been selected by the user and the selection is received by the touch panel 22, and additionally, the execute key 22F is selected and the selection is received by the touch panel 22 (YES in S12), the printer driver unit 13 determines that designation of a character color for characters for which the printing character is to be changed has been requested. Then, as shown in FIG. 5, the printer driver unit 13 determines whether designating a predetermined monochromatic color as a color of the printing character has been requested (S13). That is, when it is detected that the monochromatic color check field 22E1 has been selected by the user on the display screen in FIG. 11 and the selection is received by the touch panel 22 (YES in S13), the printer driver unit 13 determines that designation of a monochromatic color has been requested. Then, the printer driver unit 13 may cause the display unit 21 to display an instruction for prompting the user to select a monochromatic color (S14). For example, as shown in FIG. 12, the printer driver unit 13 may cause the display unit 21 to display a character color key 22G for designating a character color, an effect color key 22H for designating a color of an effect, and color buttons 22I1, 22I2, 22I3, 22I4, 22I5, 22I6, 22I7, and 22I8 in eight types of monochromatic color as a predetermined monochromatic color. In addition, as shown in FIG. 12, the printer driver unit 13 may cause the display unit 21 to display five buttons by which it is possible to designate, for example, five levels of shade, for the color buttons 22I1 to 22I8 of eight monochromatic color types.

Next, when it is detected that the character color key 22G has been selected by the user on a display screen in FIG. 12 and the selection is received by the touch panel 22, and additionally, a color button in any monochromatic color with any of five shade levels, for example, the darkest button 22I3 (on the bottom in FIG. 12) has been selected, and the selection is received by the touch panel 22, the printer driver unit 13 determines that a monochromatic color (for example, a skin color) associated with the button 22I3 has been selected. Then, the printer driver unit 13 determines whether a combination of the designated monochromatic color and the color of the recording paper set in S6 is OK (S15). For example, the printer driver unit 13 refers to the prohibition table T1 (FIG. 13) stored in the HDD 24, and determines whether a combination of the designated monochromatic color and the set color of the recording paper is prohibited in the prohibition table T1 and thus determines whether the combination is OK. Then, when it is determined that the combination is not prohibited in the prohibition table T1 (YES in S15), the printer driver unit 13 sets the designated monochromatic color (a monochromatic color associated with the darkest button 22I3) as a character color used for the printing character (S16).

Figure 14A:
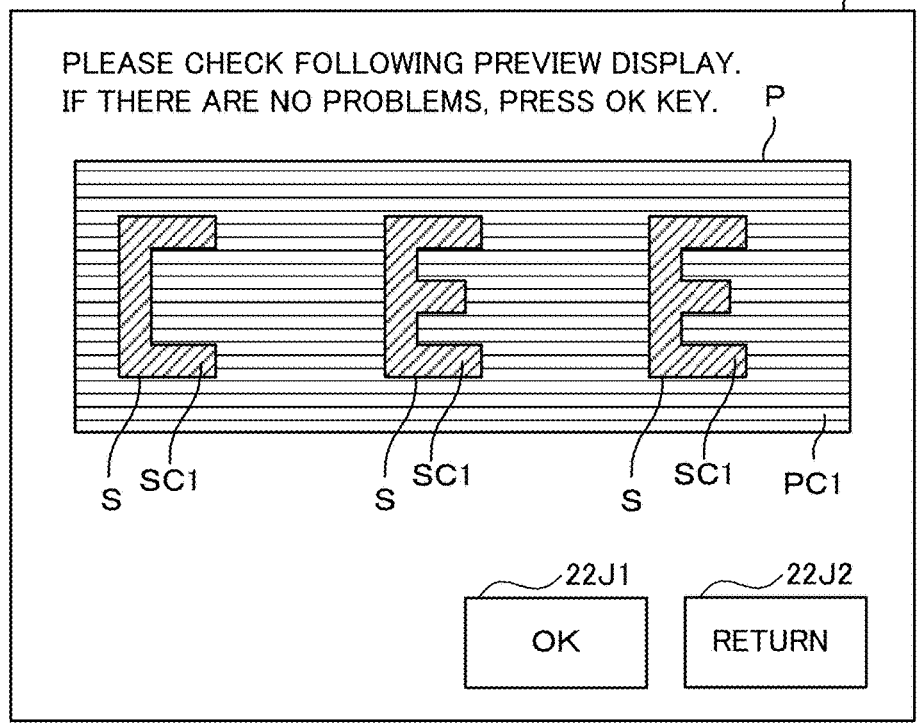
FIG. 14A and FIG. 14B are diagrams showing an example of a display screen displayed on the display unit of the information processing device.

Then, the printer driver unit 13 determines whether designating an effect and a color used for the effect for the printing character has been requested (S17). For example, the printer driver unit 13 detects whether at least one of the shadow check field 22E3 and the outline check field 22E4 has been selected by the user on the display screen in FIG. 11, and additionally, the execute key 22F has been selected by the user, and thus determines whether addition of an effect to the printing character has been requested. When it is not detected by the touch panel 22 that at least one of the shadow check field 22E3 and the outline check field 22E4 has been selected (NO in S17), the printer driver unit 13 may cause the display unit 21 to perform preview displaying using the color of the recording paper set in S6 and the monochromatic color set in S16 (S18). For example, as shown in FIG. 14A, the printer driver unit 13 may cause the display unit 21 to display images S of designated characters "C," "E," and "E" set in S11 in monochromatic colors SC1 set in S16 on an image P of the recording paper displayed in a color PC1 set in S6 as the preview display.

Then, the printer driver unit 13 determines whether preview-displayed setting detail has been approved by the user (S19). For example, when it is detected that a return key 22J2 has been selected by the user on a display screen in FIG. 14A and the selection is received by the touch panel 22 (NO in S19), the printer driver unit 13 determines that preview-displayed setting detail has not been approved by the user, the process returns to S5, and the process starts again. On the other hand, when it is detected that an OK key 22J1 has been selected by the user on a display screen in FIG. 14A and the selection is received by the touch panel 22 (YES in S19), the printer driver unit 13 determines that preview-displayed setting detail has been approved by the user and adds, as a part of the printing conditions, a second command for instructing that the monochromatic color set in S16 be used in the printing process, and the process proceeds to S50 to be described below. In addition, as shown in FIG. 7, the printer driver unit 13 may cause the designated "skin color" and "no effect" to be displayed on a display part of the printing character change key 22B2.

In addition, when the printing character is not changed in S7, on the image P of the recording paper displayed in the color PC1 set in S6, an image of characters in the color black with no effects (shadow or outline) added is preview-displayed (not shown). That is, in the information processing device 1, when the user does not issue a request for instructing the printing character to be changed, printing conditions are predetermined so that a printing process for characters is performed under designated printing conditions for document data preset as a default in the printer driver unit 13, for example, in the color black with no effects (shadow or outline). Here, in addition to the above description, a configuration in which a preview display is performed using a predetermined character sample, for example, "A" may be used.

Figure 20:
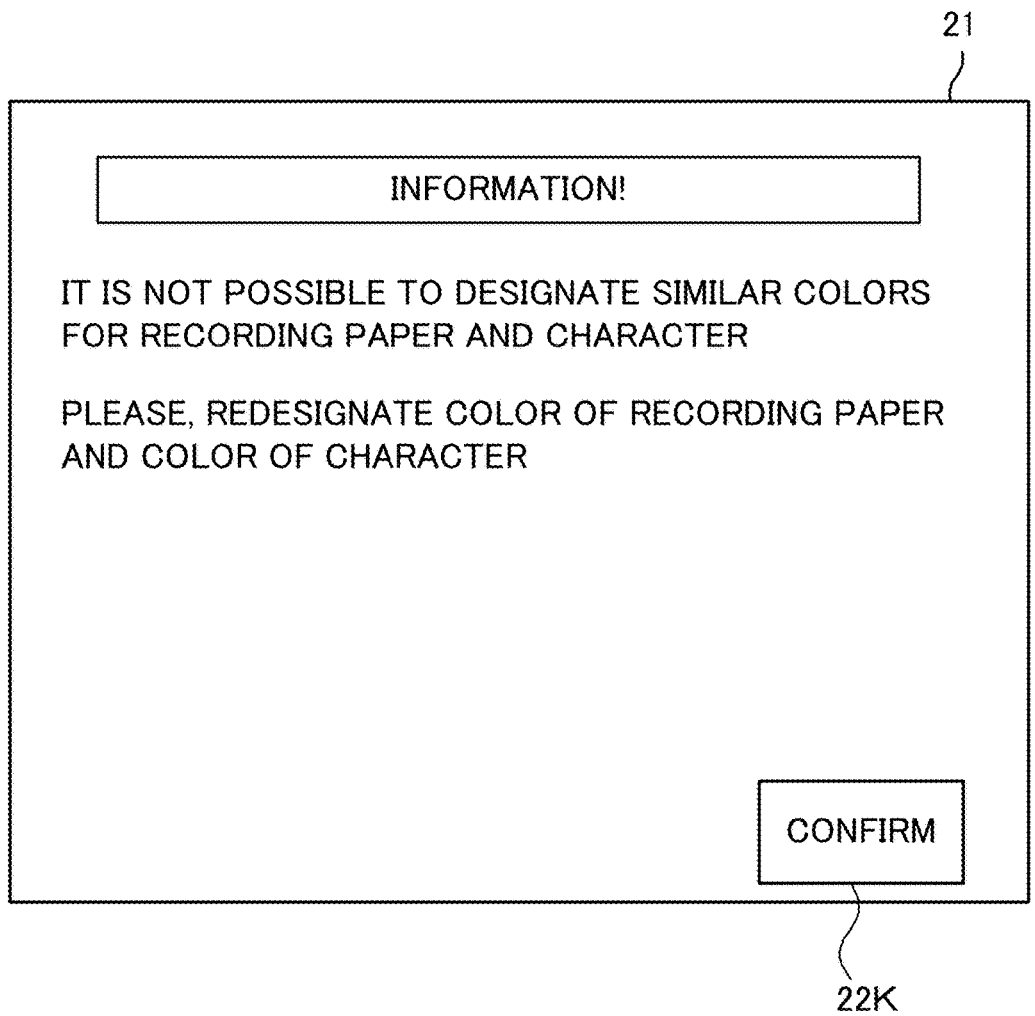
FIG. 20 is a diagram showing an example of a display screen displayed on the display unit of the information processing device.

In addition, when it is determined that a combination of the designated monochromatic color and the set color of the recording paper is prohibited in the prohibition table T1 (NO in S15), the printer driver unit 13 may cause the display unit 21 to display a message indicating that the combination has been rejected (S20). For example, as shown in FIG. 20, the printer driver unit 13 may cause the display unit 21 to display a message indicating that it is not possible to designate similar colors for the recording paper and the characters, the process returns to S5 and the process starts again. In this manner, in the present embodiment, using the prohibition table T1 that is stored in the HDD 24 in advance, when a combination of the color of the recording paper and the character color that is prohibited in the prohibition table T1 is designated by the user, execution of the printing process to which the combination is applied is rejected. Therefore, in the present embodiment, in the image forming device 2, it is possible to prevent the printing character from being printed in a character color that is difficult to read on the recording paper whose color is designated by the user in advance and it is possible to appropriately perform the printing process in the image forming device 2.

Figure 21:
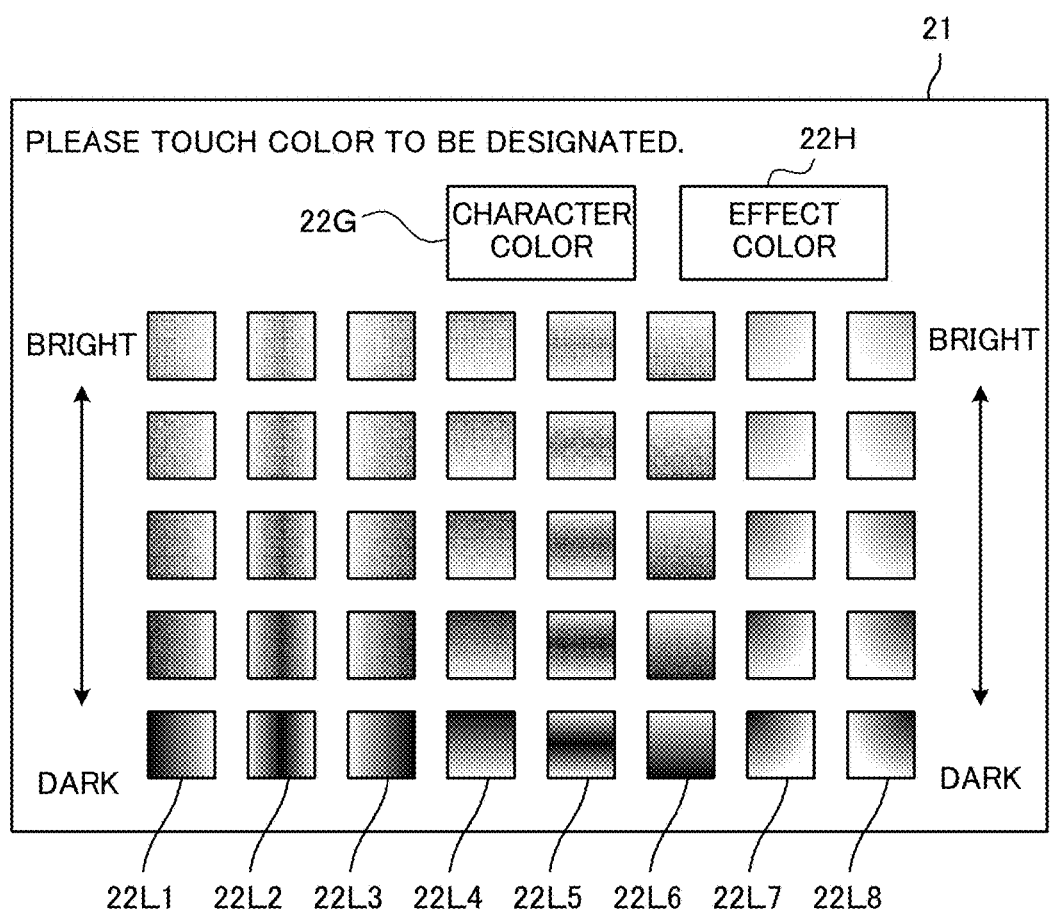
FIG. 21 is a diagram showing an example of a display screen displayed on the display unit of the information processing device.

In addition, when it is detected that the monochromatic color check field 22E1 has not been selected by the user on the display screen in FIG. 11 (NO in S13), the printer driver unit 13 determines whether designating predetermined graduated colors as colors of the printing character has been requested (S21). That is, when it is detected that the graduated color check field 22E2 has been selected by the user on the display screen in FIG. 11 and the selection is received by the touch panel 22 (YES in S21), the printer driver unit 13 determines that designation of a graduated color has been requested. Then, the printer driver unit 13 may cause the display unit 21 to display an instruction for prompting the user to select a graduated color (S22). For example, as shown in FIG. 21, the printer driver unit 13 may cause the display unit 21 to display the character color key 22G, the effect color key 22H, and buttons 22L1, 22L2, 22L3, 22L4, 22L5, 22L6, 22L7, and 22L8 in eight types of graduated color as predetermined graduated colors. In addition, as shown in FIG. 21, the printer driver unit 13 may cause the display unit 21 to display five buttons by which it is possible to designate, for example, five levels of shade, for the color buttons 22L1 to 22L8 of eight graduated color types.

Next, when it is detected that the character color key 22G has been selected by the user on a display screen in FIG. 21 and the selection is received by the touch panel 22, and additionally, a color button in any graduated color with any of five shade levels, for example, the brightest button 22L7 (on the top in FIG. 21) has been selected and the selection is received by the touch panel 22, the printer driver unit 13 determines that the graduated color associated with the button 22L7 has been designated. Then, the printer driver unit 13 determines whether a combination of the designated graduated color and the color of the recording paper set in S6 is OK (S23). For example, the printer driver unit 13 refers to the prohibition table T1 (FIG. 13) and determines whether a combination of the designated graduated color and the set color of the recording paper is prohibited in the prohibition table T1 and thus determines whether the combination is OK. Then, when it is determined that the combination is prohibited in the prohibition table T1 (NO in S23), the printer driver unit 13 may cause the display unit 21 to display a message indicating that the combination has been rejected (S20).

On the other hand, when it is determined that the combination is not prohibited in the prohibition table T1 (YES in S23), the printer driver unit 13 sets the designated graduated color (graduated color associated with the brightest button 22L7) as a character color used for the printing character (S24).

Figure 14B:
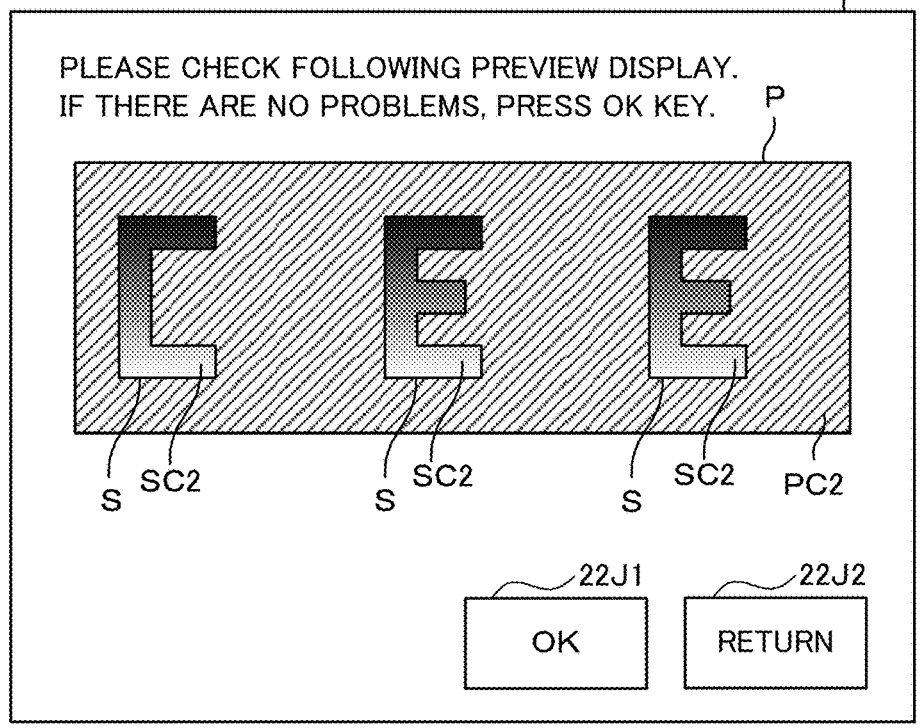

Then, the process of S17 is performed and when it is determined that designation of an effect and a color used for the effect has not been requested for the printing character set in S24 (NO in S17), the printer driver unit 13 may cause the display unit 21 to perform preview display using the color of the recording paper set in S6 and the graduated color set in S24 (S18). For example, as shown in FIG. 14B, the printer driver unit 13 may cause the display unit 21 to display images S of designated characters "C," "E," and "E" set in S11 in a graduated color SC2 set in S24 on an image P of the recording paper displayed in a color PC2 set in S6 as the preview display.

Then, the printer driver unit 13 determines whether preview-displayed setting detail has been approved by the user (S19). For example, when it is detected that the return key 22J2 has been selected by the user on a display screen in FIG. 14B and the selection is received by the touch panel 22 (NO in S19), the printer driver unit 13 determines that preview-displayed setting detail has not been approved by the user, the process returns to S5 and the process starts again. On the other hand, when it is detected that the OK key 22J1 has been selected by the user on the display screen in FIG. 14B and the selection is received by the touch panel 22 (YES in S19), the printer driver unit 13 determines that preview-displayed setting detail has been approved by the user and adds, as a part of the printing conditions, a second command for instructing that the graduated color set in S24 be used in the printing process, and the process proceeds to S50 to be described below.

In addition, when the graduated color check field 22E2 is not selected by the user on the display screen in FIG. 11 (NO in S21), the printer driver unit 13 determines whether a predetermined time has elapsed from when the display screen in FIG. 11 was displayed on the display unit 21 in S12 (S25). When it is determined that a predetermined time has not elapsed (NO in S25), the printer driver unit 13 puts the information processing device 1 in a standby state. On the other hand, when it is determined that a predetermined time has elapsed (YES in S25), the printer driver unit 13 determines that change in the character color is cancelled, and the process proceeds to S50 to be described below.

In addition, when it is detected that, after the monochromatic color is set in S16, at least one of the shadow check field 22E3 and the outline check field 22E4 has been selected in S17 and the selection is received by the touch panel 22 (YES in S17), the printer driver unit 13 determines that designation of an effect and a color used for the effect for the printing character has been requested. Then, the printer driver unit 13 determines whether designating a shadow has been requested (S26). That is, when it is detected that the shadow check field 22E3 has been selected by the user on the display screen in FIG. 11 and the selection is received by the touch panel 22 (YES in S26), the printer driver unit 13 determines that addition of a shadow as an effect has been requested. Then, the printer driver unit 13 may cause the display unit 21 to display an instruction for prompting the user to select a color used for the shadow (S27). For example, the printer driver unit 13 may cause the display unit 21 to display a display screen for designating a monochromatic color shown in FIG. 12 or a display screen for designating a graduated color shown in FIG. 21 according to an operation by the user.

Then, for example, when it is detected that the effect color key 22H has been selected by the user on the display screen in FIG. 12 and the selection is received by the touch panel 22, and additionally, a color button in any monochromatic color with any of five shade levels, for example, the darkest button 22I4 (on the bottom in FIG. 12) has been selected and the selection is received by the touch panel 22, the printer driver unit 13 determines that the monochromatic color (for example, red) associated with the button 22I4 is designated as a color used for the shadow. Then, the printer driver unit 13 determines whether a combination of the monochromatic color designated as a color used for the shadow and the color of the recording paper set in S6 is OK (S28). For example, the printer driver unit 13 refers to the prohibition table T1 (FIG. 13) and determines whether a combination of the monochromatic color designated as a color used for the shadow and the set color of the recording paper is prohibited in the prohibition table T1 and thus determines whether the combination is OK. Then, when it is determined that the combination is prohibited in the prohibition table T1 (NO in S28), the printer driver unit 13 may cause the display unit 21 to display a message indicating that the combination has been rejected (S31).

On the other hand, when it is determined that the combination is not prohibited in the prohibition table T1 (YES in S28), the printer driver unit 13 sets the monochromatic color designated for the color used for the shadow (monochromatic color associated with the darkest button 22I4) as a character color used for the shadow added to the printing character (S29). Next, the printer driver unit 13 determines whether designating an outline has been requested (S30). That is, when it is detected that the outline check field 22E4 has been selected by the user on the display screen in FIG. 11 and the selection is received by the touch panel 22 (YES in S30), the printer driver unit 13 determines that addition of an outline as an effect has been requested, and the process proceeds to S32 to be described below.

On the other hand, when the outline check field 22E4 is not selected by the user on the display screen in FIG. 11 (NO in S30), the printer driver unit 13 determines that addition of an outline as an effect is not requested. Then, the printer driver unit 13 may cause the display unit 21 to perform preview displaying using the color of the recording paper set in S6, the character color for the printing character set in S16, and the color used for the shadow set in S29 (S18). For example, as shown in FIG. 15A, the printer driver unit 13 may add a shadow image as the effect using a color SE1 used for the shadow set in S29 to images S of designated characters "C," "E," and "E" set in S11 on the image P of the recording paper displayed in the color PC1 set in S6 and cause the display unit 21 to display the images S in the character color SC1 set in S16 as the preview display.

Then, the printer driver unit 13 determines whether preview-displayed setting detail has been approved by the user (S19). For example, when it is detected that the return key 22J2 has been selected by the user on a display screen in FIG. 15A and the selection is received by the touch panel 22 (NO in S19), the printer driver unit 13 determines that preview-displayed setting detail has not been approved by the user, the process returns to S5 and the process starts again. On the other hand, when it is detected that the OK key 22J1 has been selected by the user on the display screen in FIG. 15A and the selection is received by the touch panel 22

(YES in S19), the printer driver unit 13 determines that preview-displayed setting detail has been approved by the user, and adds, as a part of the printing conditions, a second command for instructing that the monochromatic color set in S16 and a shadow set in S29 and a color used for the shadow be used in the printing process, and the process proceeds to S50 to be described below.

In addition, when it is detected that, after the monochromatic color is set in S16, the shadow check field 22E3 is not designated, but the outline check field 22E4 has been selected in S26, and the selection is received by the touch panel 22 (NO in S26), the printer driver unit 13 determines that addition of an outline as an effect has been requested. Then, the printer driver unit 13 may cause the display unit 21 to display an instruction for prompting the user to select a color used for the outline (S32). For example, the printer driver unit 13 may cause the display unit 21 to display a display screen for designating a monochromatic color shown in FIG. 12 or a display screen for designating a graduated color shown in FIG. 21 according to an operation by the user.

Then, for example, when it is detected that the effect color key 22H has been selected by the user on the display screen in FIG. 12 and the selection is received by the touch panel 22, and additionally, a color button in any monochromatic color with any of five shade levels, for example, the darkest button 22I5 (on the bottom in FIG. 12) has been selected and the selection is received by the touch panel 22, the printer driver unit 13 determines that a monochromatic color (for example, orange color) associated with the button 22I5 is designated as a color used for the outline. Then, the printer driver unit 13 determines whether a combination of the monochromatic color designated as a color used for the outline and the color of the recording paper set in S6 is OK (S33). For example, the printer driver unit 13 refers to the prohibition table T1 (FIG. 13) and determines whether a combination of the monochromatic color designated as a color used for the outline and the set color of the recording paper is prohibited in the prohibition table T1 and thus determines whether the combination is OK. Then, when it is determined that the combination is prohibited in the prohibition table T1 (NO in S33), the printer driver unit 13 may cause the display unit 21 to display a message indicating that the combination has been rejected (S31).

On the other hand, when it is determined that the combination is not prohibited in the prohibition table T1 (YES in S33), the printer driver unit 13 sets the monochromatic color designated for the color used for the outline (monochromatic color associated with the darkest button 22I5) as a character color used for the outline added to the printing character (S34). Then, the printer driver unit 13 may cause the display unit 21 to perform preview display using the color of the recording paper set in S6, the character color for the printing character set in S16, and the color used for the outline set in S34 (S18). For example, as shown in FIG. 15B, the printer driver unit 13 may add an outline image as the effect using a color SE2 used for the outline set in S34 to images S of designated characters "C," "E," and "E" set in S11 on the image P of the recording paper displayed in the color PC1 set in S6 and cause the display unit 21 to display the images S in the character color SC1 set in S16 as the preview display.

Then, the printer driver unit 13 determines whether preview-displayed setting detail has been approved by the user (S19). For example, when it is detected that the return key 22J2 has been selected by the user on a display screen in FIG. 15B and the selection is received by the touch panel 22 (NO in S19), the printer driver unit 13 determines that preview-displayed setting detail has not been approved by the user, the process returns to S5 and the process starts again. On the other hand, when it is detected that the OK key 22J1 has been selected by the user on the display screen in FIG. 15B and the selection is received by the touch panel 22 (YES in S19), the printer driver unit 13 determines that preview-displayed setting detail has been approved by the user and adds, as a part of the printing conditions, a second command for instructing that the monochromatic color set in S16 and an outline set in S34 and a color used for the outline be used in the printing process, and the process proceeds to S50 to be described below.

In addition, when it is detected that, after the graduated color is set in S24, the shadow check field 22E3 has been selected in S26 and the selection is received by the touch panel 22 (YES in S26), the printer driver unit 13 determines that addition of a shadow as an effect has been requested. Then, the printer driver unit 13 may cause the display unit 21 to display an instruction for prompting the user to select a color used for the shadow (S27). For example, the printer driver unit 13 may cause the display unit 21 to display a display screen for designating a monochromatic color shown in FIG. 12 or a display screen for designating a graduated color shown in FIG. 21 according to an operation by the user.

Then, for example, when it is detected that the effect color key 22H has been selected by the user on the display screen in FIG. 12 and the selection is received by the touch panel 22, and additionally, a color button in any monochromatic color with any of five shade levels, for example, the darkest button 22I4 (on the bottom in FIG. 12) has been selected and the selection is received by the touch panel 22, the printer driver unit 13 determines that the monochromatic color (for example, red) associated with the button 22I4 is designated as a color used for the shadow. Then, the printer driver unit 13 determines whether a combination of the monochromatic color designated as a color used for the shadow and the color of the recording paper set in S6 is OK (S28). For example, the printer driver unit 13 refers to the prohibition table T1 (FIG. 13) and determines whether a combination of the monochromatic color designated as a color used for the shadow and the set color of the recording paper is prohibited in the prohibition table T1 and thus determines whether the combination is OK. Then, when it is determined that the combination is prohibited in the prohibition table T1 (NO in S28), the printer driver unit 13 may cause the display unit 21 to display a message indicating that the combination has been rejected (S31).

On the other hand, when it is detected that the combination is not prohibited in the prohibition table T1 (YES in S28), the printer driver unit 13 sets the monochromatic color designated for the color used for the shadow (monochromatic color associated with the darkest button 22I4) as a character color used for the shadow added to the printing character (S29). Next, the printer driver unit 13 determines whether designating an outline has been requested (S30). That is, when it is detected that the outline check field 22E4 has been selected by the user on the display screen in FIG. 11 and the selection is received by the touch panel 22 (YES in S30), the printer driver unit 13 determines that addition of an outline as an effect has been requested and the process proceeds to S32 to be described below.

Figure 16A:
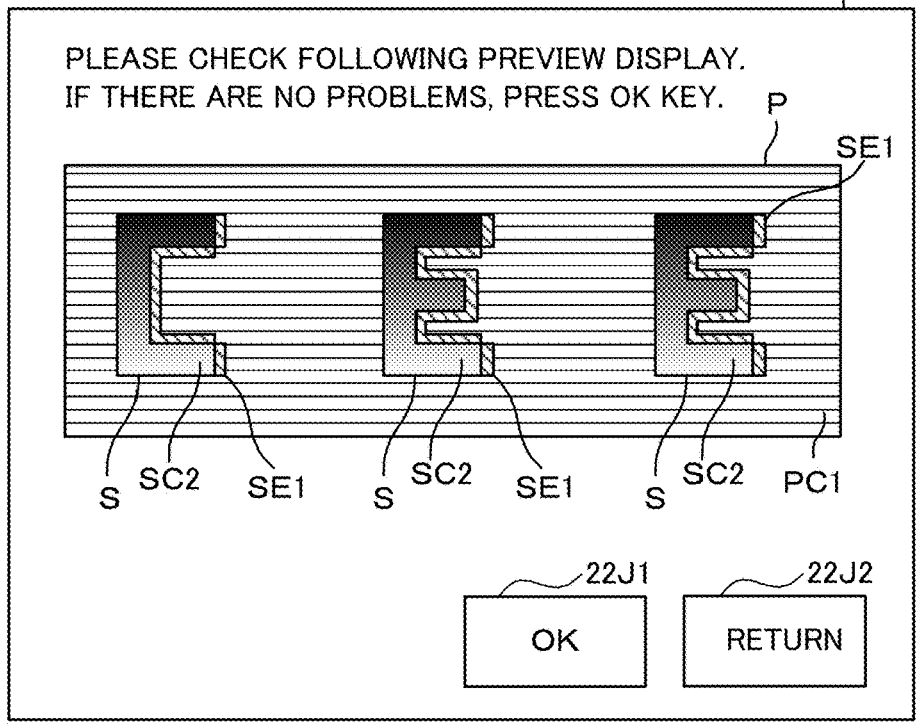
FIG. 16A and FIG. 16B are diagrams showing an example of a display screen displayed on the display unit of the information processing device.

On the other hand, when the outline check field 22E4 is not selected by the user on the display screen in FIG. 11 (NO in S30), the printer driver unit 13 determines that addition of an outline as an effect is not requested. Then, the printer driver unit 13 may cause the display unit 21 to perform preview display using the color of the recording paper set in S6, the character color for the printing character set in S24, and the color used for the shadow set in S29 (S18). For example, as shown in FIG. 16A, the printer driver unit 13 may add a shadow image as the effect using a color SE1 used for the shadow set in S29 to images S of designated characters "C," "E," and "E" set in S11 on the image P of the recording paper displayed in the color PC1 set in S6 and cause the display unit 21 to display the images S in the character color SC2 set in S24 as the preview display.

Then, the printer driver unit 13 determines whether preview-displayed setting detail has been approved by the user (S19). For example, when it is detected that the return key 22J2 has been selected by the user on a display screen in FIG. 16A and the selection is received by the touch panel 22 (NO in S19), the printer driver unit 13 determines that preview-displayed setting detail has not been approved by the user, the process returns to S5 and the process starts again. On the other hand, when it is detected that the OK key 22J1 has been selected by the user on a display screen in FIG. 16A and the selection is received by the touch panel 22 (YES in S19), the printer driver unit 13 determines that preview-displayed setting detail has been approved by the user and adds, as a part of the printing conditions, a second command for instructing that the graduated color set in S24 and a shadow set in S29 and a color used for the shadow be used in the printing process, and the process proceeds to S50 to be described below.

In addition, when it is detected that, after the monochromatic color is set in S24, the shadow check field 22E3 is not designated, but the outline check field 22E4 has been selected in S26, and the selection is received by the touch panel 22 (NO in S26), the printer driver unit 13 determines that addition of an outline as an effect has been requested. Then, the printer driver unit 13 may cause the display unit 21 to display an instruction for prompting the user to select a color used for the outline (S32). For example, the printer driver unit 13 may cause the display unit 21 to display a display screen for designating a monochromatic color shown in FIG. 12 or a display screen for designating a graduated color shown in FIG. 21 according to an operation by the user.

Then, for example, when it is detected that the effect color key 22H has been selected by the user on the display screen in FIG. 12 and the selection is received by the touch panel 22, and additionally, a color button in any monochromatic color with any of five shade levels, for example, the darkest button 22I5 (on the bottom in FIG. 12) has been selected and the selection is received by the touch panel 22, the printer driver unit 13 determines that a monochromatic color (for example, orange color) associated with the button 22I5 is designated as a color used for the outline. Then, the printer driver unit 13 determines whether a combination of the monochromatic color designated as a color used for the outline and the color of the recording paper set in S6 is OK (S33). For example, the printer driver unit 13 refers to the prohibition table T1 (FIG. 13) and determines whether a combination of the monochromatic color designated as a color used for the shadow and the set color of the recording paper is prohibited in the prohibition table T1 and thus determines whether the combination is OK. Then, when it is determined that the combination is prohibited in the prohibition table T1 (NO in S33), the printer driver unit 13 may cause the display unit 21 to display a message indicating that the combination has been rejected (S31).

Figure 16B:
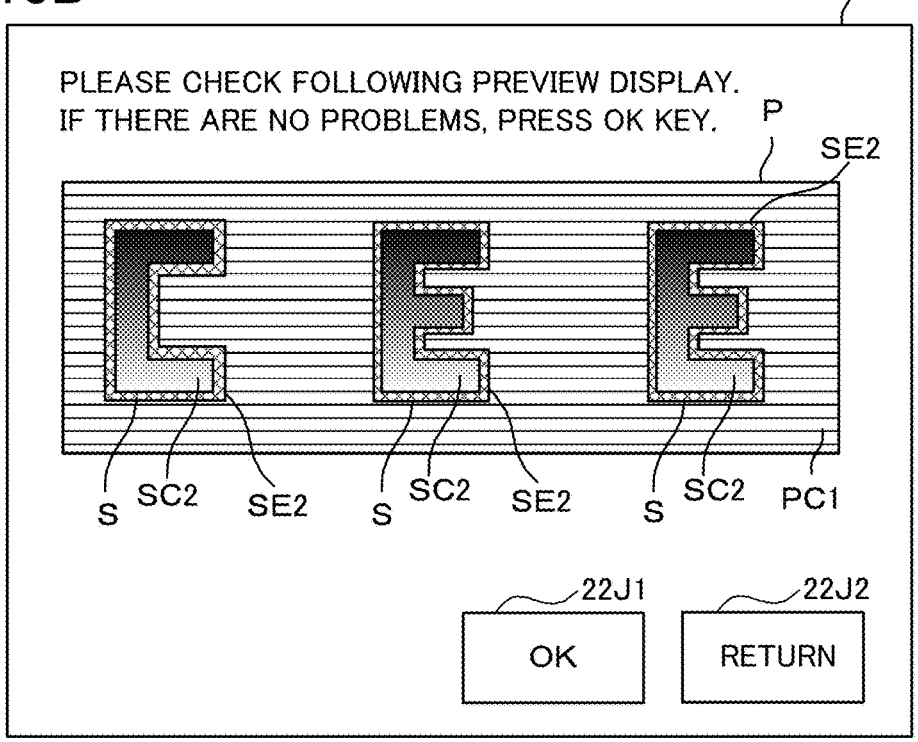

On the other hand, when it is detected that the combination is not prohibited in the prohibition table T1 (YES in S33), the printer driver unit 13 sets the monochromatic color designated as a color used for the outline (monochromatic color associated with the darkest button 22I5) as a character color used for the outline added to the printing character (S34). Then, the printer driver unit 13 may cause the display unit 21 to perform preview display using the color of the recording paper set in S6, the character color for the printing character set in S24, and the color used for the outline set in S34 (S18). For example, as shown in FIG. 16B, the printer driver unit 13 may add an outline image as the effect using a color SE2 used for the outline set in S34 to images S of designated characters "C," "E," and "E" set in S11 on the image P of the recording paper displayed in the color PC1 set in S6 and cause the display unit 21 to display the image S in the character color SC2 set in S24 as the preview display.

Then, the printer driver unit 13 determines whether preview-displayed setting detail has been approved by the user (S19). For example, when it is detected that the return key 22J2 has been selected by the user on a display screen in FIG. 16B and the selection is received by the touch panel 22 (NO in S19), the printer driver unit 13 determines that preview-displayed setting detail has not been approved by the user, the process returns to S5, and the process starts again. On the other hand, when it is detected that the OK key 22J1 has been selected by the user on the display screen in FIG. 16B and the selection is received by the touch panel 22 (YES in S19), the printer driver unit 13 determines that preview-displayed setting detail has been approved by the user and adds, as a part of the printing conditions, a second command for instructing that the graduated color set in S24 and an outline set in S34 and a color used for the outline be used in the printing process, and the process proceeds to S50 to be described below.

In addition, when it is detected that, after the monochromatic color is set in S16, the shadow check field 22E3 has been selected in S26, the outline check field 22E4 has been selected in S30, and the selection is received by the touch panel 22 (YES in S30), the printer driver unit 13 determines that addition of an outline as an effect has been requested in addition to addition of a shadow. Then, the printer driver unit 13 may cause the display unit 21 to display an instruction for prompting the user to select a color used for the outline (S32). For example, the printer driver unit 13 may cause the display unit 21 to display a display screen for designating a monochromatic color shown in FIG. 12 or a display screen for designating a graduated color shown in FIG. 21 according to an operation by the user.

Then, for example, when it is detected that the effect color key 22H has been selected by the user on the display screen in FIG. 12 and the selection is received by the touch panel 22, and additionally, a color button in any monochromatic color with any of five shade levels, for example, the darkest button 22I5 (on the bottom in FIG. 12) has been selected and the selection is received by the touch panel 22, the printer driver unit 13 determines that a monochromatic color (for example, orange color) associated with the button 22I5 is designated as a color used for the outline. Then, the printer driver unit 13 determines whether a combination of the monochromatic color designated as a color used for the outline and the color of the recording paper set in S6 is OK (S33). For example, the printer driver unit 13 refers to the prohibition table T1 (FIG. 13), determines whether a combination of the monochromatic color designated as a color used for the outline and the set color of the recording paper is prohibited in the prohibition table T1, and thus determines whether the combination is OK. Then, when it is determined that the combination is prohibited in the prohibition table T1 (NO in S33), the printer driver unit 13 may cause the display unit 21 to display a message indicating that the combination has been rejected (S31).

Figure 17A:
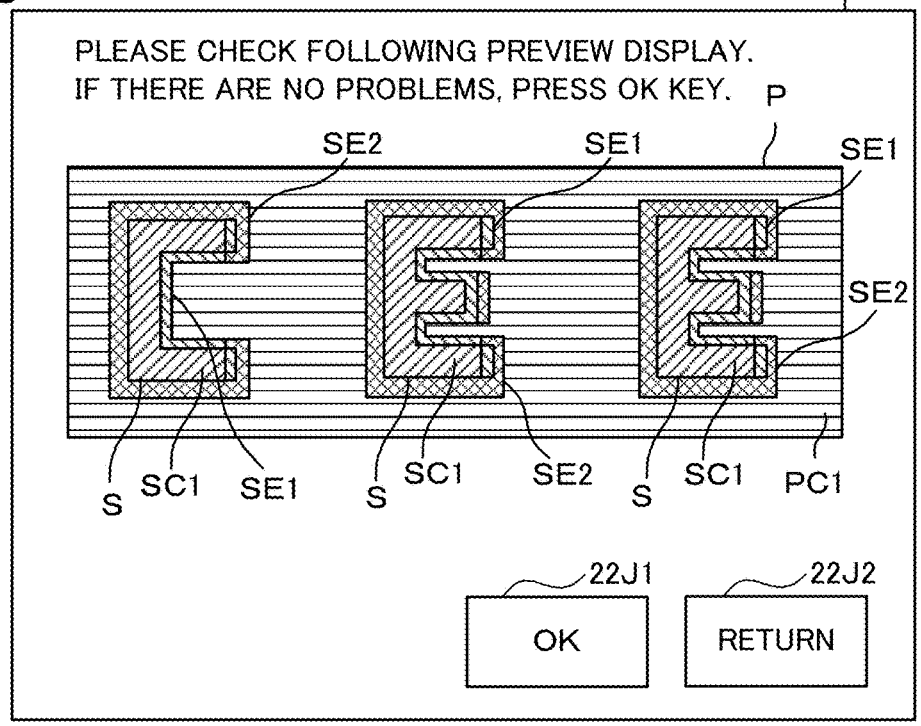
FIG. 17A and FIG. 17B are diagrams showing an example of a display screen displayed on the display unit of the information processing device.

On the other hand, when it is determined that the combination is not prohibited in the prohibition table T1 (YES in S33), the printer driver unit 13 sets the monochromatic color (monochromatic color associated with the darkest button 22I5) designated for the color used for the outline as a character color used for the outline added to the printing character (S34). Then, the printer driver unit 13 may cause the display unit 21 to perform preview display using the color of the recording paper set in S6, the character color for the printing character set in S16, the color used for the shadow set in S29, and the color used for the outline set in S34 (S18). For example, as shown in FIG. 17A, the printer driver unit 13 may add shadow and outline images as effects using a color SE1 used for the shadow set in S29 and a color SE2 used for the outline set in S34 to images S of designated characters "C," "E," and "E" set in S11 on the image P of the recording paper displayed in the color PC1 set in S6 and cause the display unit 21 to display the image S in the character color SC1 set in S16 as the preview display.

Then, the printer driver unit 13 determines whether preview-displayed setting detail has been approved by the user (S19). For example, when it is detected that the return key 22J2 has been selected by the user on a display screen in FIG. 17A and the selection is received by the touch panel 22 (NO in S19), the printer driver unit 13 determines that preview-displayed setting detail has not been approved by the user, the process returns to S5, and the process starts again. On the other hand, when it is detected that the OK key 22J1 has been selected by the user on the display screen in FIG. 17A and the selection is received by the touch panel 22 (YES in S19), the printer driver unit 13 determines that preview-displayed setting detail has been approved by the user and adds, as a part of the printing conditions, a second command for instructing that the monochromatic color set in S16, a shadow set in S29 and a color used for the shadow, and an outline set in S34 and a color used for the outline be used in the printing process, and the process proceeds to S50 to be described below.

In addition, when it is detected that, after the graduated color is set in S24, the shadow check field 22E3 has been selected in S26, the outline check field 22E4 has been selected in S30, and the selection is received by the touch panel 22 (YES in S30), the printer driver unit 13 determines that addition of an outline as an effect has been requested in addition to addition of a shadow. Then, the printer driver unit 13 may cause the display unit 21 to display an instruction for prompting the user to select a color used for the outline (S32). For example, the printer driver unit 13 may cause the display unit 21 to display a display screen for designating a monochromatic color shown in FIG. 12 or a display screen for designating a graduated color shown in FIG. 21 according to an operation by the user.

Then, for example, when it is detected that the effect color key 22H has been selected by the user on the display screen in FIG. 12 and the selection is received by the touch panel 22, and additionally, a color button in any monochromatic color with any of five shade levels, for example, the darkest button 22I5 (on the bottom in FIG. 12) has been selected and the selection is received by the touch panel 22, the printer driver unit 13 determines that a monochromatic color (for example, orange color) associated with the button 22I5 is designated as a color used for the outline. Then, the printer driver unit 13 determines whether a combination of the monochromatic color designated as a color used for the outline and the color of the recording paper set in S6 is OK (S33). For example, the printer driver unit 13 refers to the prohibition table T1 (FIG. 13), determines whether a combination of the monochromatic color designated as a color used for the outline and the set color of the recording paper is prohibited in the prohibition table T1, and thus determines whether the combination is OK. Then, when it is determined that the combination is prohibited in the prohibition table T1 (NO in S33), the printer driver unit 13 may cause the display unit 21 to display a message indicating that the combination has been rejected (S31).

Figure 17B:
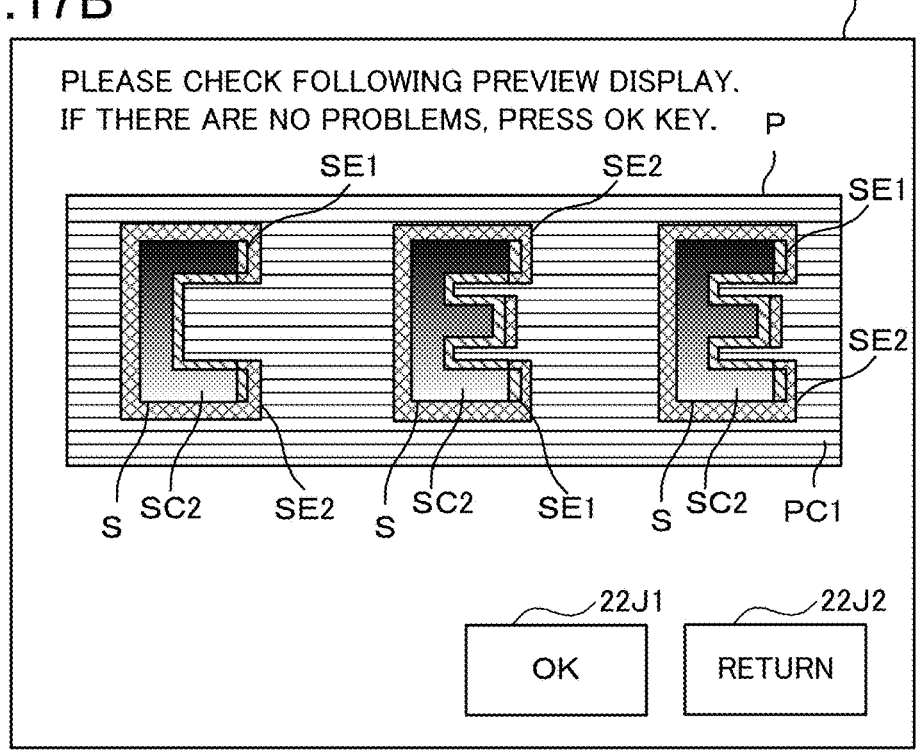

On the other hand, when it is determined that the combination is not prohibited in the prohibition table T1 (YES in S33), the printer driver unit 13 sets the monochromatic color (monochromatic color associated with the darkest button 22I5) designated for the color used for the outline as a character color used for the outline added to the printing character (S34). Then, the printer driver unit 13 may cause the display unit 21 to perform preview display using the color of the recording paper set in S6, the character color for the printing character set in S24, the color used for the shadow set in S29, and the color used for the outline set in S34 (S18). For example, as shown in FIG. 17B, the printer driver unit 13 may add shadow and outline images as effects using a color SE1 used for the shadow set in S29 and a color SE2 used for the outline set in S34 to images S of designated characters "C," "E," and "E" set in S11 on the image P of the recording paper displayed in the color PC1 set in S6 and cause the display unit 21 to display the images S in the character color SC2 set in S24 as the preview display.

Then, the printer driver unit 13 determines whether preview-displayed setting detail has been approved by the user (S19). For example, when it is detected that the return key 22J2 has been selected by the user on a display screen in FIG. 17B and the selection is received by the touch panel 22 (NO in S19), the printer driver unit 13 determines that preview-displayed setting detail has not been approved by the user, the process returns to S5, and the process starts again. On the other hand, when it is detected that the OK key 22J1 has been selected by the user on the display screen in FIG. 17B and the selection is received by the touch panel 22 (YES in S19), the printer driver unit 13 determines that preview-displayed setting detail has been approved by the user and adds, as a part of the printing conditions, a second command for instructing that the graduated color set in S24, a shadow set in S29 and a color used for the shadow, and an outline set in S34 and a color used for the outline be used in the printing process, and the process proceeds to S50 to be described below.

In addition, when it is determined that addition of an effect has been requested for the printing character during the process in S12, as shown in FIG. 6, the printer driver unit 13 determines whether designating an effect and a color used for the effect for the printing character has been requested (S35). For example, the printer driver unit 13 may determine whether at least one of addition of a shadow and addition of an outline as an effect for the printing character has been requested by detecting whether at least one of the shadow check field 22E3 and the outline check field 22E4 has been selected by the user on the display screen in FIG. 11, and additionally, the execute key 22F has been selected by the user. When it is not detected by the touch panel 22 that at least one of the shadow check field 22E3 and the outline check field 22E4 has been selected (NO in S35), the printer driver unit 13 determines whether a predetermined time has elapsed from when the display screen in FIG. 11 was displayed on the display unit 21 in S12 (S36). When it is determined that a predetermined time has not elapsed (NO in S36), the printer driver unit 13 puts the information processing device 1 in a standby state. On the other hand, when it is determined that a predetermined time has elapsed (YES in S36), the printer driver unit 13 determines that addition of the effect is cancelled, and the process proceeds to S50 to be described below.

In addition, the printer driver unit 13 determines whether designating a shadow has been requested (S37). That is, when it is detected that the shadow check field 22E3 has been selected by the user on the display screen in FIG. 11 and the selection is received by the touch panel 22 (YES in S37), the printer driver unit 13 determines that addition of a shadow as an effect has been requested. Then, the printer driver unit 13 may cause the display unit 21 to display an instruction for prompting the user to select a color used for the shadow (S38). For example, the printer driver unit 13 may cause the display unit 21 to display a display screen for designating a monochromatic color shown in FIG. 12 or a display screen for designating a graduated color shown in FIG. 21 according to an operation by the user.

Then, for example, when it is detected that the effect color key 22H has been selected by the user on the display screen in FIG. 12 and the selection is received by the touch panel 22, and additionally, a color button in any monochromatic color with any of five shade levels, for example, the darkest button 22I4 (on the bottom in FIG. 12) has been selected and the selection is received by the touch panel 22, the printer driver unit 13 determines that the monochromatic color (for example, red) associated with the button 22I4 is designated as a color used for the shadow. Then, the printer driver unit 13 determines whether a combination of the monochromatic color designated as a color used for the shadow and the color of the recording paper set in S6 is OK (S39). For example, the printer driver unit 13 refers to the prohibition table T1 (FIG. 13) and determines whether a combination of the monochromatic color designated as a color used for the shadow and the set color of the recording paper is prohibited in the prohibition table T1 and thus determines whether the combination is OK. Then, when it is determined that the combination is prohibited in the prohibition table T1 (NO in S39), the printer driver unit 13 may cause the display unit 21 to display a message indicating that the combination has been rejected (S42).

On the other hand, when it is determined that the combination is not prohibited in the prohibition table T1 (YES in S39), the printer driver unit 13 sets the monochromatic color (monochromatic color associated with the darkest button 22I4) designated for the color used for the shadow as a character color used for the shadow added to the printing character (S40). Next, the printer driver unit 13 determines whether designating of an outline has been requested (S41). That is, when it is detected that the outline check field 22E4 has been selected by the user on the display screen in FIG. 11 and the selection is received by the touch panel 22 (YES in S41), the printer driver unit 13 determines that addition of an outline as an effect has been requested and the process proceeds to S43 to be described below.

Figure 18A:
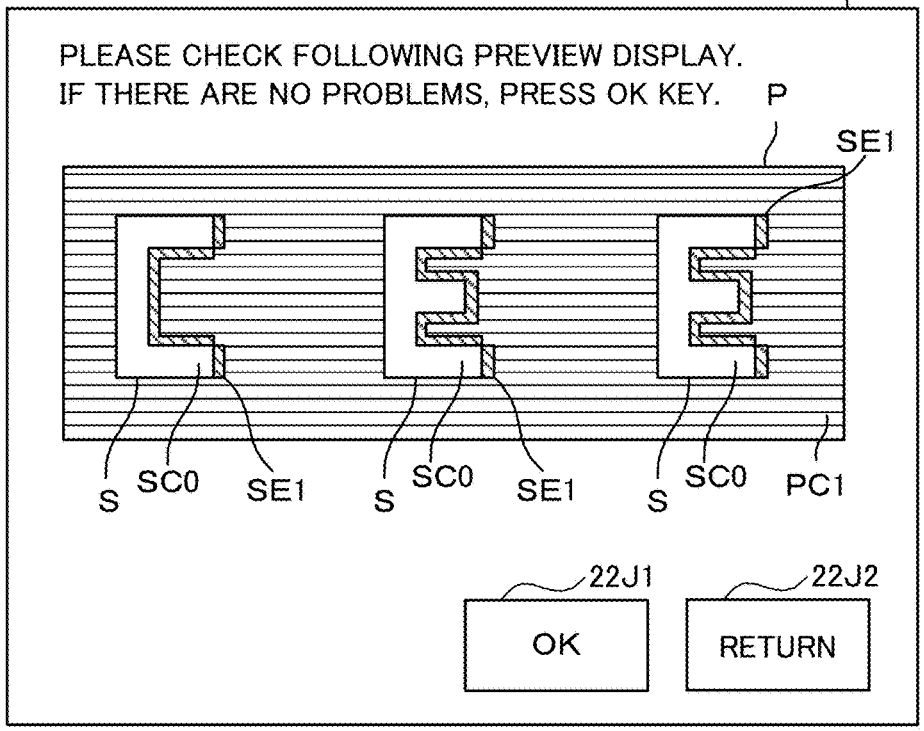
FIG. 18A and FIG. 18B are diagrams showing an example of a display screen displayed on the display unit of the information processing device.

On the other hand, when the outline check field 22E4 is not selected by the user on the display screen in FIG. 11 (NO in S41), the printer driver unit 13 determines that addition of an outline as an effect is not requested. Then, the printer driver unit 13 may cause the display unit 21 to perform preview display using the color of the recording paper set in S6 and the color used for the shadow set in S40 (S18). For example, as shown in FIG. 18A, the printer driver unit 13 may add a shadow image as the effect using the color SE1 used for the shadow set in S40 to images S of designated characters "C," "E," and "E" set in S11 on the image P of the recording paper displayed in the color PC1 set in S6 and cause the display unit 21 to display the images S in a color black SC0 preset as the default in the printer driver unit 13 as the preview display.

Then, the printer driver unit 13 determines whether preview-displayed setting detail has been approved by the user (S19). For example, when it is detected that the return key 22J2 has been selected by the user on a display screen in FIG. 18A and the selection is received by the touch panel 22 (NO in S19), the printer driver unit 13 determines that preview-displayed setting detail has not been approved by the user, the process returns to S5, and the process starts again. On the other hand, when it is detected that the OK key 22J1 has been selected by the user on the display screen in FIG. 18A and the selection is received by the touch panel 22 (YES in S19), the printer driver unit 13 determines that preview-displayed setting detail has been approved by the user and adds, as a part of the printing conditions, a second command for instructing that the color black set as the default and a shadow set in S29 and a color used for the shadow be used in the printing process, and the process proceeds to S50 to be described below.

In addition, when it is detected that the shadow check field 22E3 is not designated, but the outline check field 22E4 has been selected in S37, and the selection is received by the touch panel 22 (NO in S37), the printer driver unit 13 determines that addition of an outline as an effect has been requested. Then, the printer driver unit 13 may cause the display unit 21 to display an instruction for prompting the user to select a color used for the outline (S43). For example, the printer driver unit 13 may cause the display unit 21 to display a display screen for designating a monochromatic color shown in FIG. 12 or a display screen for designating a graduated color shown in FIG. 21 according to an operation by the user.

Then, for example, when it is detected that the effect color key 22H has been selected by the user on the display screen in FIG. 12 and the selection is received by the touch panel 22, and additionally, a color button in any monochromatic color with any of five shade levels, for example, the darkest button 22I5 (on the bottom in FIG. 12) has been selected and the selection is received by the touch panel 22, the printer driver unit 13 determines that a monochromatic color (for example, orange color) associated with the button 22I5 is designated as a color used for the outline. Then, the printer driver unit 13 determines whether a combination of the monochromatic color designated as a color used for the outline and the color of the recording paper set in S6 is OK (S44). For example, the printer driver unit 13 refers to the prohibition table T1 (FIG. 13), determines whether a combination of the monochromatic color designated as a color used for the outline and the set color of the recording paper is prohibited in the prohibition table T1, and thus determines whether the combination is OK. Then, when it is determined that the combination is prohibited in the prohibition table T1 (NO in S44), the printer driver unit 13 may cause the display unit 21 to display a message indicating that the combination has been rejected (S42).

Figure 18B:
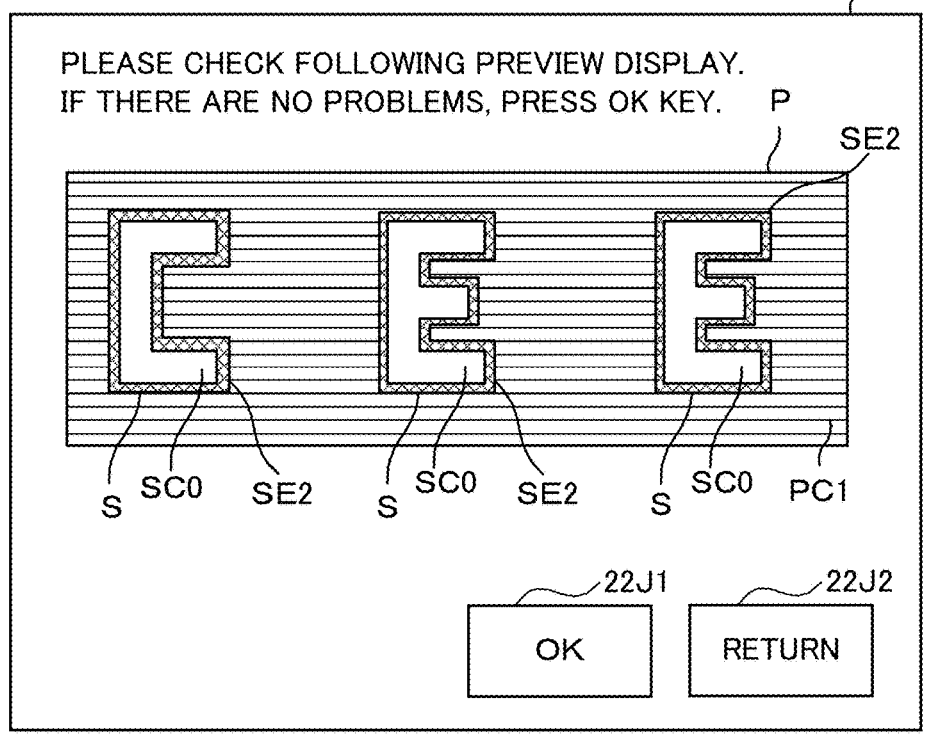

On the other hand, when it is determined that the combination is not prohibited in the prohibition table T1 (YES in S44), the printer driver unit 13 sets the monochromatic color designated for the color used for the outline (monochromatic color associated with the darkest button 22I5) as a character color used for the outline added to the printing character (S45). Then, the printer driver unit 13 may cause the display unit 21 to perform preview display using the color of the recording paper set in S6 and a color used for the outline set in S45 (S18). For example, as shown in FIG. 18B, the printer driver unit 13 may add an outline image as the effect using the color SE2 used for the outline set in S44 to images S of designated characters "C," "E," and "E" set in S11 on the image P of the recording paper displayed in the color PC1 set in S6 and cause the display unit 21 to display the image S in the color black SC0 preset as the default in the printer driver unit 13 as the preview display.

Then, the printer driver unit 13 determines whether preview-displayed setting detail has been approved by the user (S19). For example, when it is detected that the return key 22J2 has been selected by the user on a display screen in FIG. 18B and the selection is received by the touch panel 22 (NO in S19), the printer driver unit 13 determines that preview-displayed setting detail has not been approved by the user, the process returns to S5, and the process starts again. On the other hand, when it is detected that the OK key 22J1 has been selected by the user on the display screen in FIG. 18B and the selection is received by the touch panel 22 (YES in S19), the printer driver unit 13 determines that preview-displayed setting detail has been approved by the user and adds, as a part of the printing conditions, a second command for instructing that the color black set as the default and an outline set in S45 and a color used for the outline be used in the printing process and the process proceeds to S50 to be described below.

In addition, when it is detected that, after the shadow check field 22E3 has been selected in S37, the outline check field 22E4 has been selected in S41, and the selection is received by the touch panel 22 (YES in S41), the printer driver unit 13 determines that addition of an outline as an effect has been requested in addition to addition of a shadow. Then, the printer driver unit 13 may cause the display unit 21 to display an instruction for prompting the user to select a color used for the outline (S43). For example, the printer driver unit 13 may cause the display unit 21 to display a display screen for designating a monochromatic color shown in FIG. 12 or a display screen for designating a graduated color shown in FIG. 21 according to an operation by the user.

Then, for example, when it is detected that the effect color key 22H has been selected by the user on the display screen in FIG. 12 and the selection is received by the touch panel 22, and additionally, a color button in any monochromatic color with any of five shade levels, for example, the darkest button 22I5 (on the bottom in FIG. 12) has been selected and the selection is received by the touch panel 22, the printer driver unit 13 determines that a monochromatic color (for example, orange color) associated with the button 22I5 is designated as a color used for the outline. Then, the printer driver unit 13 determines whether a combination of the monochromatic color designated as a color used for the outline and the color of the recording paper set in S6 is OK (S44). For example, the printer driver unit 13 refers to the prohibition table T1 (FIG. 13), determines whether a combination of the monochromatic color designated as a color used for the outline and the set color of the recording paper is prohibited in the prohibition table T1, and determines whether the combination is OK. Then, when it is determined that the combination is prohibited in the prohibition table T1 (NO in S44), the printer driver unit 13 may cause the display unit 21 to display a message indicating that the combination has been rejected (S42).

Figure 19:
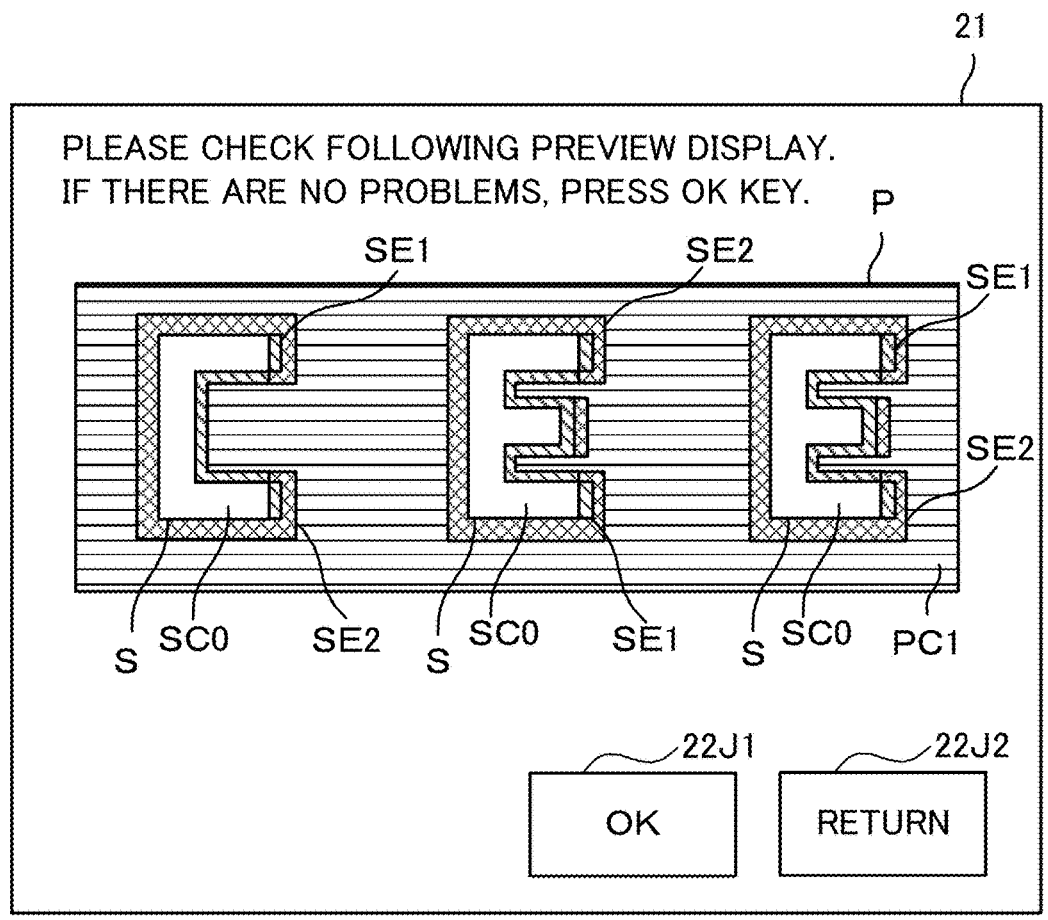
FIG. 19 is a diagram showing an example of a display screen displayed on the display unit of the information processing device.

On the other hand, when it is determined that the combination is not prohibited in the prohibition table T1 (YES in S44), the printer driver unit 13 sets the monochromatic color designated for the color used for the outline (monochromatic color associated with the darkest button 22I5) as a character color used for the outline added to the printing character (S45). Then, the printer driver unit 13 may cause the display unit 21 to perform preview display using the color of the recording paper set in S6, the color used for the shadow set in S40, and the color used for the outline set in S45 (S18). For example, as shown in FIG. 19, the printer driver unit 13 may to add shadow and outline images as effects using the color SE1 used for the shadow set in S40 and the color SE2 used for the outline set in S45 to images S of designated characters "C," "E," and "E" set in S11 on the image P of the recording paper displayed in the color PC1 set in S6 and cause the display unit 21 display the images S in the color black SC0 preset as the default in the printer driver unit 13 as the preview display.

Then, the printer driver unit 13 determines whether preview-displayed setting detail has been approved by the user (S19). For example, when it is detected that the return key 22J2 has been selected by the user on a display screen in FIG. 19 and the selection is received by the touch panel 22 (NO in S19), the printer driver unit 13 determines that preview-displayed setting detail has not been approved by the user, the process returns to S5, and the process starts again. On the other hand, when it is detected that the OK key 22J1 has been selected by the user on the display screen in FIG. 19 and the selection is received by the touch panel 22 (YES in S19), the printer driver unit 13 determines that preview-displayed setting detail has been approved by the user and adds, as a part of the printing conditions, a second command for instructing that the color black set as the default, a shadow set in S40 and a color used for the shadow, and an outline set in S45 and a color used for the outline be used in the printing process, and the process proceeds to S50 to be described below.

Incidentally, while a configuration in which the same character color and/or the same effect is applied to all designated characters "C," "E," and "E" in S11 has been described above, the present embodiment is not limited thereto. For example, a configuration in which the processes of S12 to S19 are performed on the set designated characters "C," "E," and "E," and different character colors and/or different effects are applied to the designated characters may be used.

In addition, in S9, when change in the printing character is set for all characters included in the document data, for example, the same character color and/or the same effect may be applied to all characters included in the printed matter shown in FIG. 10.

In addition, when it is determined that preview-displayed setting detail has been approved by the user in S19, the printer driver unit 13 may set other printing conditions (S50). For example, when it is detected that the double-sided printing key 22B3 has been selected by the user on a display screen in FIG. 7 and the selection is received by the touch panel 22, the printer driver unit 13 may cause the display unit 21 to display an instruction for prompting the user to designate whether to perform double-sided printing (not shown). Then, for example, when it is detected that double-sided printing is designated by the user (on) and the designation is received by the touch panel 22, the printer driver unit 13 sets double-sided printing as a printing condition. On the other hand, when it is detected that double-sided printing has not been selected by the user (off) and the designation is received by the touch panel 22, the printer driver unit 13 sets not performing double-sided printing, that is, single-sided printing, as a printing condition. Then, as shown in FIG. 7, the printer driver unit 13 may cause the designated "off" to be displayed on a display part of the double-sided printing key 22B3. Here, when double-sided printing is set, the printer driver unit 13 may cause the designated "on" to be displayed on a display part of the double-sided printing key 22B3 (not shown).

In addition, for example, when it is detected that the page aggregation key 22B4 has been selected by the user on the display screen in FIG. 7 and the selection is received by the touch panel 22, the printer driver unit 13 may cause the display unit 21 to display an instruction for prompting the user to designate whether to perform aggregation (not shown). Then, for example, when it is detected that aggregation (on) has been designated by the user and the selection is received by the touch panel 22, the printer driver unit 13 may cause the display unit 21 to display an instruction for prompting specific aggregation designation such as "2 in 1" or "4 in 1" (not shown). Then, for example, when it is detected that "2 in 1" aggregation has been designated by the user and the designation has been received by the touch panel 22, the printer driver unit 13 sets "2 in 1" aggregation as a printing condition. Then, the printer driver unit 13 may causes "2 in 1" set in the part of the page aggregation key 22B4 to be displayed (not shown). On the other hand, when it is detected that no aggregation has been designated (off) by the user and the designation is received by the touch panel 22, the printer driver unit 13 sets not performing aggregation as a printing condition. Then, as shown in FIG. 7, the printer driver unit 13 may cause the designated "off" to be displayed on a display part of the page aggregation key 22B4.

In addition, for example, when it is detected that the print copy number key 22B5 has been selected by the user on the display screen in FIG. 7 and the selection is received by the touch panel 22, the printer driver unit 13 may cause the display unit 21 to display an instruction for prompting the user to designate a print copy number (not shown). For example, the printer driver unit 13 may cause the display unit 21 to display a numeric keypad in order to input the number of copies to be printed (not shown). Then, for example, when it is detected that "1" has been designated by the user and the designation is received by the touch panel 22, the printer driver unit 13 determines that one copy is designated as a print copy number and sets one copy as a printing condition. In addition, as shown in FIG. 7, the printer driver unit 13 may cause the designated print copy number "1" to be displayed on a display part of the print copy number key.

Then, the printer driver unit 13 determines whether the operation reception unit has received an instruction to create a print job (S51). For example, the printer driver unit 13 may determine whether an instruction to create a print job has been requested by detecting whether a settings key 22C has been selected by the user on the display screen in FIG. 7. When it is not detected by the touch panel 22 that the settings key 22C has been selected (NO in S51), the process does not proceed to S52, and the printer driver unit 13 puts the information processing device 1 in a standby state.

On the other hand, when it is detected that the settings key 22C has been selected by the user and the selection is received by the touch panel 22 (YES in S51), the printer driver unit 13 converts document data (for example, document data with file name "document 1.doc") set in S3 into data generated in a printer language suitable for the image forming device 2, and creates a print job including printing target data created according to printing conditions (for example, "recording paper color designation: purple", "printing character change: skin color, with no effect", "double-sided printing: off," aggregation: off, "print copy number: 1") set in S19 and S50 using the converted data generated in a printer language (S52). In addition, in this manner, when the printer driver unit 13 creates a print job, the printer driver unit 13 stores the created print job in the HDD 24.

Then, the control section 11 determines whether the operation reception unit has received an instruction to transmit a print job (S53). For example, the control section 11 may determine whether an instruction to transmit a print job has been performed by detecting whether a transmit key 22D has been selected by the user on the display screen in FIG. 7. When it is not detected by the touch panel 22 that the transmit key 22D has been selected (NO in S53), the process does not proceed to S54, and the control section 11 puts the information processing device 1 in a standby state.

On the other hand, when it is detected that the transmit key 22D has been selected by the user and the selection is received by the touch panel 22 (YES in S53), the control section 11 determines that an instruction to transmit a print job has been requested. Then, the communication control section 12 transmits the print job created in S52 from the communication unit 23 to the image forming device 2 via the network N (S54).

Figure 22:
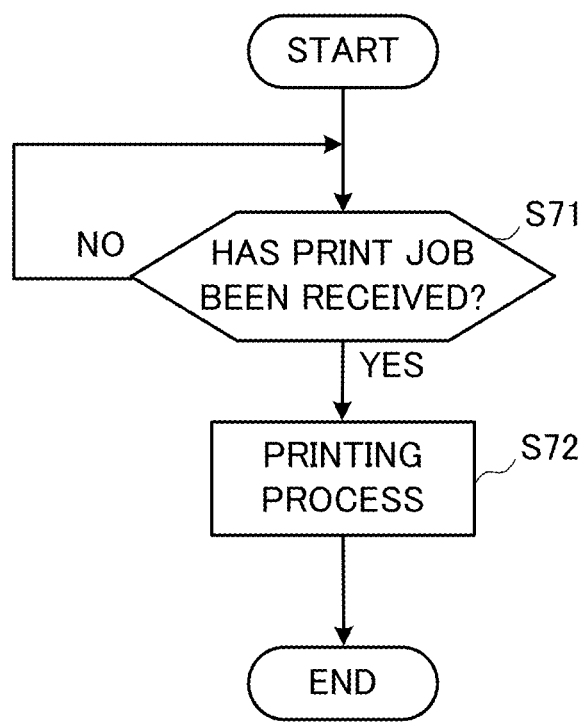
FIG. 22 is a flowchart showing a flow of processes performed by the image forming device.

Next, operations of the image forming device 2 the present embodiment will be described in detail with reference to FIG. 22. FIG. 22 is a flowchart showing a flow of processes performed by the image forming device. Operations when a print job is transmitted from the information processing device 1 will be mainly described below.

The control section 31 determines whether the transmitting and receiving unit 53 has received a print job from the information processing device 1 (S71). When it is not determined that a print job has received from the information processing device 1 (NO in S71), the process does not proceed to S72, and the control section 31 puts the image forming device 2 in a standby state.

On the other hand, when it is determined that the transmitting and receiving unit 53 has received a print job from the information processing device 1, the control section 31 may cause the printing unit 42 to perform a printing process based on the received print job (S72). Therefore, the print job transmitted from the information processing device 1 is printed by the image forming device 2, and the result is provided to the user as printed matter.

As described above, in the present embodiment, in the information processing device 1, when the operation reception unit receives a designated color of the recording paper, the printer driver unit 13 acquires position information of the paper feed cassettes 9a to 9d of the image forming device 2 associated with color information indicating the designated color of the recording paper from the HDD 24, and adds, as a part of the printing conditions, a first command for instructing that the recording paper accommodated in the paper feed cassettes 9a to 9d indicated by the acquired position information of the paper feed cassettes 9a to 9d be used in the printing process. In addition, when the operation reception unit receives at least one of designation of a character color and designation of an effect and a color used for the effect, the printer driver unit 13 adds, as a part of the printing conditions, a second command for instructing that the designated character color and the designated effect and color used for the effect be used in the printing process. Therefore, in the present embodiment, unlike the examples of the related art, according to the operation of the information processing device 1, in the image forming device 2, it is possible for the user to perform the printing process for characters with a desired color and effect on recording paper in a color that the user desires.

Incidentally, in the first technology and the second technology described in the background art, according to the operation of the information processing device, in the image forming device, it is not possible for the user to perform the printing process for characters with a desired color and a desired effect (adding a shadow or adding an outline) on a recording medium in a color that the user desires. That is, in both the first technology and the second technology, there is no description of technology in which, according to the operation of the information processing device in such a manner, the user changes a desired color or effect, and the image forming device performs the printing process for characters on a recording medium in a color that the user desires.

On the other hand, in the present embodiment, according to the operation of the information processing device, in the image forming device, the user changes a desired color or effect for a recording medium to a color that the user desires, and the printing process for characters can be performed.

In addition, in the information processing device 1 of the present embodiment, when designation of a color of the recording paper is received and additionally, at least one of designation of a character color and designation of an effect and a color used for the effect is received, the display unit 21 performs preview display. Therefore, before a printing process is actually performed by the image forming device 2, the user can see a color of the recording paper of the printed matter, a printing character color and the like in the printing process, and the user can easily obtain desired printed matter.

Incidentally, a configuration in which, when the operation reception unit receives designation of a color of the recording paper, the printer driver unit 13 may cause the display unit 21 to display an instruction for prompting the user to designate a color of the characters included in the document data to be subjected to the printing process and designate a predetermined effect for the characters included in the document data and a color used for the effect for the recording paper has been described in the above embodiment. However, the present embodiment is not limited thereto. A configuration in which, when the operation reception unit receives designation of a color of the recording paper, the printer driver unit 13 may cause the display unit 21 to display an instruction to perform at least one of designation of a color of the characters included in the document data to be subjected to the printing process, and designation of a predetermined effect for the characters included in the document data and a color used for the effect for the recording paper may be used.

Figure 23:
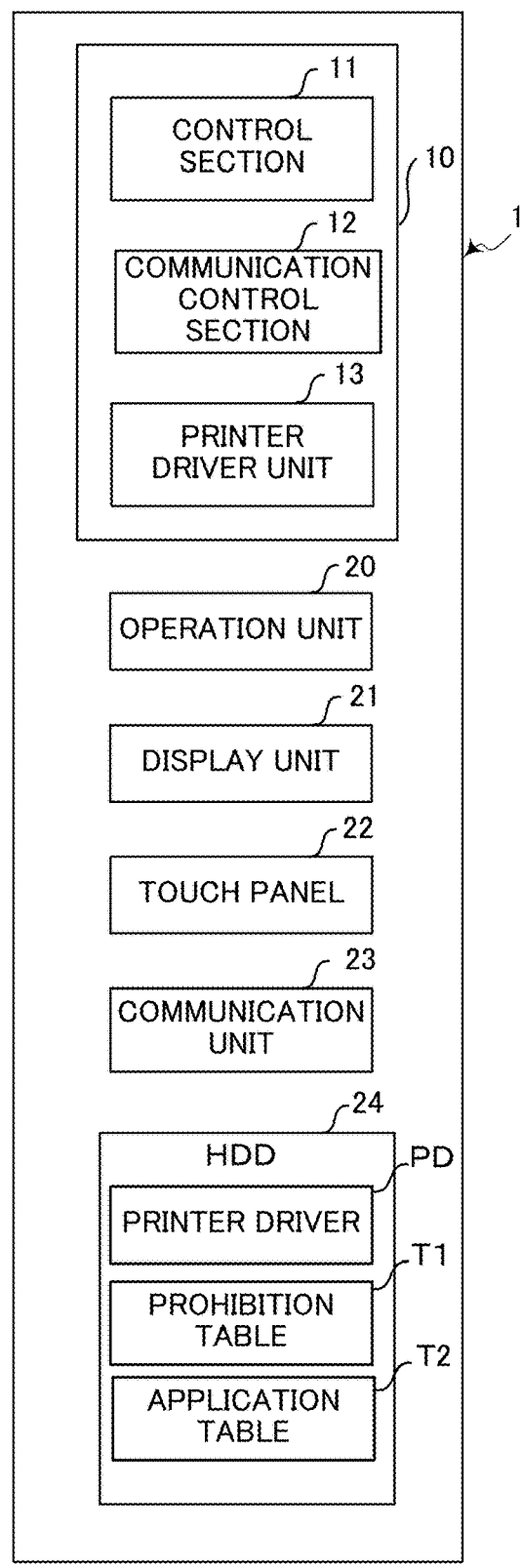
FIG. 23 is a functional block diagram showing a configuration of main parts of an information processing device according to a second embodiment.

Next, the information processing device 1 according to a second embodiment will be described in detail with reference to FIG. 23. FIG. 23 is a functional block diagram showing a configuration of main parts of the information processing device according to the second embodiment. It should be noted that description of the configuration which is the same as in the above embodiment will be omitted.

As shown in FIG. 23, in the HDD 24 of the information processing device 1 of the present embodiment, an application table T2 showing combination relationships between a designated character color and an effect associated with the designated character color and a color used for the effect is stored in advance.

For example, as shown in FIG. 24, in the application table T2, combination relationships between a character color for a color A and a shadow associated with the character color for the color A and a color B2 as a color used for the shadow are shown.

In addition, in the information processing device 1 of the present embodiment, when the operation reception unit receives designation of a color of the recording paper, the printer driver unit 13 may not cause the display unit 21 to display an instruction for prompting the user to designate an effect and a color used for the effect, and the printer driver unit 13 may cause the display unit 21 to display an instruction for prompting the user to designate a character color.

In addition, in the information processing device 1 of the present embodiment, when the operation reception unit receives designation of a character color, the printer driver unit 13 may refer to the application table T2, acquire an effect associated with the designated character color and a color used for the effect, and adds, as a part of the printing conditions, a command for instructing that the designated character color and the acquired effect and a color used for the effect be applied to the designated characters as a second command.

Figure 25:
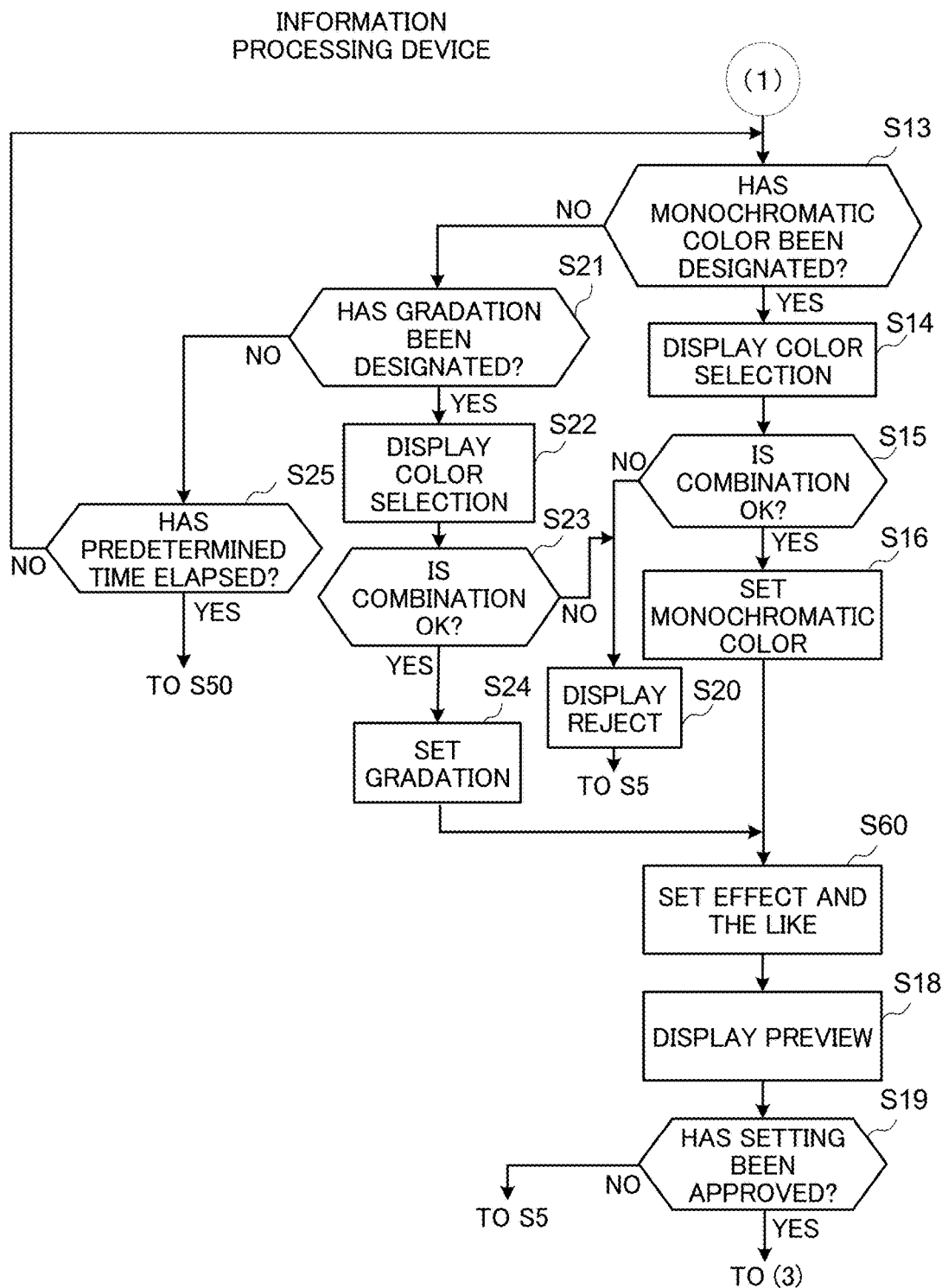
FIG. 25 is a flowchart showing a flow of processes performed by the information processing device according to the second embodiment.

Next, processing operations of the information processing device 1 according to the second embodiment will be described in detail with reference to FIG. 25. FIG. 25 is a flowchart showing a flow of processes performed by the information processing device according to the second embodiment.

Figure 26:
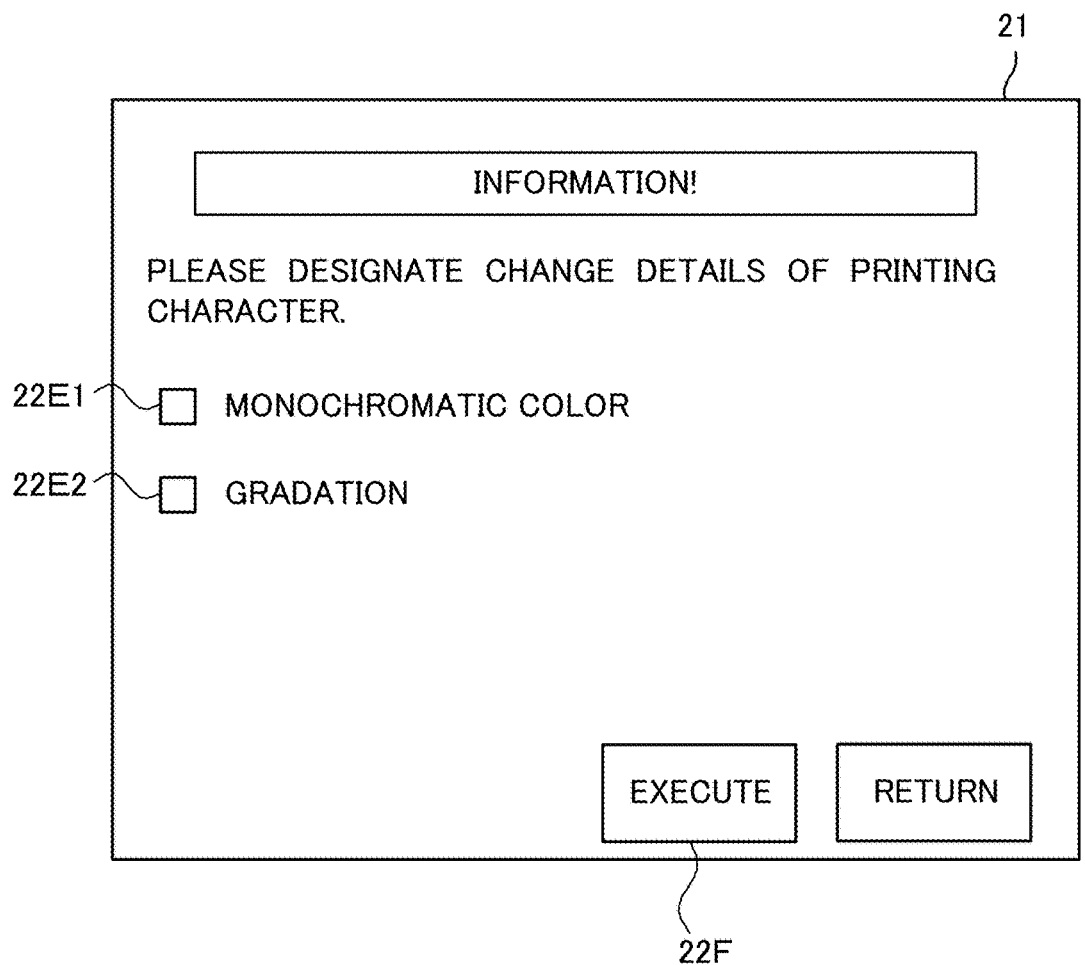
FIG. 26 is a diagram showing an example of a display screen displayed on the display unit of the information processing device.

When it is determined whether designating a character color for characters for which the printing character is to be changed has been requested in S12, the printer driver unit 13 may not cause the display unit 21 to display an instruction for prompting the user to designate an effect and a color used for the effect, and the printer driver unit 13 may cause the display unit 21 to display an instruction for prompting the user to designate a character color. For example, as shown in FIG. 26, the printer driver unit 13 may cause the display unit 21 to display a check field 22E1 for displaying an image showing that an operation by the user is able to be performed so that the user can designate a predetermined monochromatic color as a color of the printing character and display the check field 22E2 for displaying an image showing that an operation by the user is able to be performed so that the user can designate predetermined graduated colors as the printing character color.

In addition, when a monochromatic color is set as a character color used for the printing character in S16 or a graduated color is set as a character color used for the printing character in S24, the printer driver unit 13 may refer to the application table T2 and set an effect and a color used for the effect based on the set monochromatic color or graduated color (S60). For example, when the brightest button 22L7 (on the top in FIG. 21) is set as a character color used for the printing character in S24, the printer driver unit 13 acquires an effect (for example, adding an outline) associated with the color indicated by the brightest button 22L7 and a color (for example, a color A1) used for the effect from the application table T2. Then, the printer driver unit 13 sets the acquired outline and color for the color A1 used for the outline as an effect for the printing character and a color used for the effect. Then, in the display unit 21, for example, the preview display shown in FIG. 16B is performed. Therefore, according to the preview display, a combination of the color of the recording paper designated by the user, a printing character color designated by the user, and an effect designated using the application table T2 and a color used for the effect is visually provided for the user.

As described above, in the present embodiment, in the information processing device 1, when a color of the recording paper and a character color used for the printing character are designated, the printer driver unit 13 may refer to the application table T2 and an effect and a color used for the effect may be set according to the designated character color. Therefore, in the present embodiment, the user can change a desired color and a desired effect for recording paper in a color that the user desires, and the printing process for characters can be easily performed.

Here, in the above embodiment, the configuration and processes described in the above embodiment with reference to FIG. 1 to FIG. 26 are only one embodiment of the present disclosure, and the present disclosure is not limited to this configuration and these processes.

While the present disclosure has been described in detail with reference to the embodiments thereof, it would be apparent to those skilled in the art the various changes and modifications may be made therein within the scope defined by the appended claims.

What is claimed is:

1. An information processing device comprising:
a display unit;
an operation reception unit including an operation unit and a touch panel, the operation unit and the touch panel being configured to receive an operation instruction from a user;
a communication unit including a communication module and being configured to perform data communication with an image forming device via a network;
a storage device in which position information of a paper feed cassette of the image forming device in which a recording medium used for a printing process performed by the image forming device is accommodated and color information indicating a color of the recording medium accommodated in the paper feed cassette are stored in association with each other in advance; and
a control unit including a processor,
the processor functioning, in executing a print request program, as:
a printer driver unit configured to create, from document data to be subjected to the printing process that is received by the operation reception unit, a print job including printing target data created according to printing conditions received by the operation reception unit; and
a communication control section configured to transmit the print job created by the printer driver unit from the communication unit to the image forming device via the network,
wherein when the operation reception unit receives the printing conditions, the printer driver unit causes the display unit to display an instruction for prompting the user to designate a color of the recording medium,
when the operation reception unit receives designation of a color of the recording medium, the printer driver unit acquires position information of the paper feed cassette associated with color information indicating the designated color of the recording medium from the storage device, adds, as a part of the printing conditions, a first command for instructing that the recording medium, which is accommodated in the paper feed cassette indicated by the position information of the paper feed cassette, be used in the printing process, and causes the display unit to display an instruction to perform at least one of designation of a character color of a character included in the document data to be subjected to the printing process on the recording medium for which the color has been designated and designation of a predetermined effect for the character and a color used for the effect,
when the operation reception unit receives at least one of designation of the character color and designation of the effect and a color used for the effect, the printer driver unit adds, as a part of the printing conditions, a second command for instructing that the designated character color and the designated effect and color used for the effect be used in the printing process,
in the storage device, an application table showing combination relationships between a designated character color and an effect associated with the designated character color and a color used for the effect is stored in advance,
when the operation reception unit receives designation of a color of the recording medium, the printer driver unit does not cause the display unit to display an instruction for prompting the user to designate the effect and a color used for the effect, and the printer driver unit causes the display unit to display only an instruction for prompting the user to designate the character color, and
when the operation reception unit receives designation of the character color, the printer driver unit refers to the application table, acquires the effect associated with the designated character color and a color used for the effect, and adds, as a part of the printing conditions, a command for instructing that the effect and the color used for the effect be applied to the designated character as the second command.

2. The information processing device according to claim 1,
wherein, when the operation reception unit receives at least one of designation of the character color and designation of the effect and a color used for the effect, the printer driver unit causes the display unit to display an image of a character sample on an image of the recording medium displayed in the designated color of the recording medium for which the color has been designated, and display a preview of an image to which the designated character color and the designated effect and color used for the effect are added to the image of the character sample.

3. The information processing device according to claim 1,
wherein, in the storage device, a prohibition table showing combination relationships between a color of the recording medium and the character color and a color used for the effect that have been determined to be prohibited in advance is stored in advance, and
when the operation reception unit receives at least one of designation of a color of the recording medium and designation of the character color and designation of a color used for the effect, the printer driver unit refers to the prohibition table, and when it is determined that the designated color of the recording medium and the designated character color or the designated color used for the effect are shown in the prohibition table, causes the display unit to display a message indicating that the designated color of the recording medium and the designated character color and the designated color used for the effect have been rejected.

4. The information processing device according to claim 1, wherein the operation reception unit receives designation of a predetermined monochromatic color or designation of predetermined graduated color as designation of the character color and designation of a color used for the effect.

5. The information processing device according to claim 1, wherein the printer driver unit converts the document data received by the operation reception unit into data generated in a printer language suitable for the image forming device, and creates a print job including printing target data created according to the printing conditions received by the operation reception unit using the converted data generated in a printer language.

6. The information processing device according to claim 1, wherein the operation reception unit receives at least one of adding a shadow and adding an outline to the character for which the effect is added as designation of the effect.

7. The information processing device according to claim 1, wherein the printer driver unit causes the display unit to display an instruction for prompting the user to designate a range of characters to be designated on the document data to be subjected to the printing process on the recording medium for which the color has been designated, when the operation reception unit receives designation of a range of characters to be designated, the printer driver unit causes the display unit to display an instruction prompting performing at least one of designation of the character color and designation of the predetermined effect and a color used for the effect in the designated range of characters.

8. An image forming system comprising:
an information processing device; and
an image forming device connected to the information processing device via a network,
wherein the information processing device according to claim 1 is used as the information processing device, and
the image forming device includes
a plurality of the paper feed cassettes in which the recording medium is accommodated;
a printing unit configured to perform a printing process on the recording medium;
a reception unit configured to receive the print job from the information processing device; and
a control section configured to cause the printing unit to perform a printing process based on the print job received by the reception unit.

* * * * *